(12) United States Patent
Horn et al.

(10) Patent No.: US 11,755,057 B2
(45) Date of Patent: *Sep. 12, 2023

(54) METHOD, SYSTEM, AND COMPUTER PROGRAM PRODUCT FOR PRODUCING ACCURATE IEEE 1588 PTP TIMESTAMPS IN A SYSTEM WITH VARIABLE PHY LATENCY

(71) Applicant: CoMIRA Solutions Inc., Pittsburgh, PA (US)

(72) Inventors: Aaron Horn, Pittsburgh, PA (US); Thomas Jackson, Pittsburgh, PA (US); Don Cober, Pittsburgh, PA (US); Nishanth Channakeshava, Pittsburgh, PA (US); Ramana Venkata, Pittsburgh, PA (US); Brian Jacobs, Pittsburgh, PA (US); Farjad Zaim, Pittsburgh, PA (US)

(73) Assignee: CoMIRA Solutions Inc., Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/698,171

(22) Filed: Mar. 18, 2022

(65) Prior Publication Data

US 2022/0269302 A1 Aug. 25, 2022

Related U.S. Application Data

(63) Continuation of application No. 16/863,406, filed on Apr. 30, 2020, now Pat. No. 11,281,250.

(Continued)

(51) Int. Cl.
*G06F 1/04* (2006.01)
*H04L 43/106* (2022.01)
(Continued)

(52) U.S. Cl.
CPC .............. *G06F 1/04* (2013.01); *H04L 7/0054* (2013.01); *H04L 43/0817* (2013.01);
(Continued)

(58) Field of Classification Search
CPC ..... G06F 1/04; G06F 1/14; G01D 9/00; H04J 3/0667; H04L 7/0037; H04L 7/0054; H04W 56/001
See application file for complete search history.

(56) References Cited

U.S. PATENT DOCUMENTS 9,939,838 B1 * 4/2018 Gao ......................... G06F 1/04
10,097,339 B1 * 10/2018 Pogue ................... H04J 3/0667

OTHER PUBLICATIONS

Ganga, "Baseline Adoption Summary", IEEE P802.3ba Task Force Meeting, 2008, 240 pages, retrieved from http://grouper.ieee.org/groups/802/3/ba/BaselineSummary_0908.pdf.

(Continued)

*Primary Examiner* — Kyung H Shin
(74) *Attorney, Agent, or Firm* — THE WEBB LAW FIRM

(57) ABSTRACT

Provided is a method for calculating a timestamp associated with a data packet before transcoding of the data packet. The method may include sampling a time of day (TOD) signal to provide a sampled TOD. A previously sampled TOD estimate may be retrieved. An internal TOD estimate may be determined based on the sampled TOD and the previously sampled TOD estimate. A timestamp may be determined based on the internal TOD estimate. A system and computer program product are also disclosed.

20 Claims, 12 Drawing Sheets

Related U.S. Application Data

(60) Provisional application No. 62/840,688, filed on Apr. 30, 2019.

(51) Int. Cl.
  H04L 43/0852 (2022.01)
  H04L 43/0817 (2022.01)
  H04L 43/0823 (2022.01)
  H04L 7/00 (2006.01)
  *G06F 1/14* (2006.01)
  *G01D 9/00* (2006.01)
  *H04L 101/622* (2022.01)

(52) U.S. Cl.
  CPC ...... H04L 43/0823 (2013.01); H04L 43/0858 (2013.01); H04L 43/106 (2013.01); *G01D 9/00* (2013.01); *G06F 1/14* (2013.01); *H04L 7/0037* (2013.01); *H04L 2101/622* (2022.05)

(56) References Cited

OTHER PUBLICATIONS

Tse et al., "Improving PTP Timestamping Accuracy on Ethernet Interfaces Draft Call For Interest—for consensus building", Microchip, 2019, 50 pages, retrieved from https://www.ieee802.org/3/ad_hoc/ngrates/public/19_05/tse_nea_01a_0519.pdf.

"IEEE 1588-2008—IEEE Standard for a Precision Clock Synchronization Protocol for Networked Measurement and Control Systems", IEEE Instrumentation and Measurement Society, 2008, 289 pages.

"IEEE 802.3-2012—IEEE Standard for Ethernet", IEEE Computer Society, 2012, 3748 pages.

"IEEE 802.3-2018—IEEE Standard for Ethernet", IEEE Computer Society, 2018, 5600 pages.

\* cited by examiner

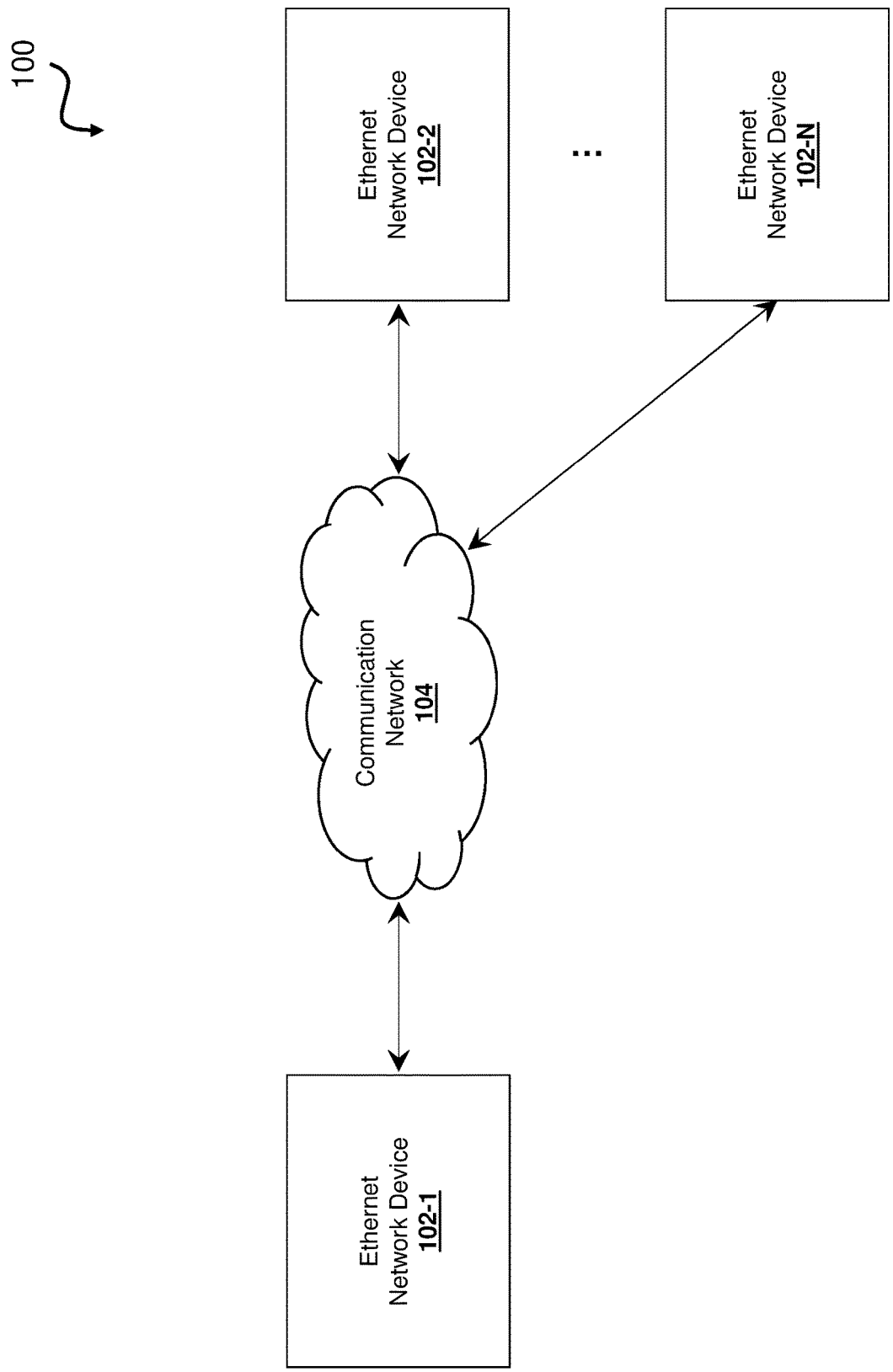

METHOD, SYSTEM, AND COMPUTER PROGRAM PRODUCT FOR PRODUCING ACCURATE IEEE 1588 PTP TIMESTAMPS IN A SYSTEM WITH VARIABLE PHY LATENCY

CROSS-REFERENCE TO RELATED APPLICATIONS

This application is a continuation application of U.S. patent application Ser. No. 16/863,406, filed Apr. 30, 2020, which claims priority to U.S. Provisional Patent Application No. 62/840,688, filed Apr. 30, 2019, the disclosures of which are hereby incorporated by reference in their entirety.

BACKGROUND

1. Field

This disclosed subject matter relates generally to methods, systems, and products for producing accurate timestamps and, in some particular embodiments, to a method, system, and computer program product for producing accurate timestamps (e.g., IEEE 1588 PTP timestamps and/or the like) in a system with variable physical (PHY) layer latency.

2. Technical Considerations

Certain communication systems (e.g., computer networks, Ethernet networks, and/or the like) may use protocols to synchronize clocks and timestamp data packets (e.g., messages and/or the like) communicated therein. For example, 1588-2008—*IEEE Standard for a Precision Clock Synchronization Protocol for Networked Measurement and Control Systems*, IEEE (2008) (hereinafter "IEEE 1588-2008") and 1588-2019—*IEEE Approved Draft Standard for a Precision Clock Synchronization Protocol for Networked Measurement and Control Systems*, IEEE (2019) (hereinafter "IEEE 1588-2019") (collectively "IEEE 1588"), the disclosures of which are hereby incorporated by reference in their entireties, describe Precision Time Protocol (PTP). PTP provides fault tolerant synchronization for different clocks on the same network. As part of PTP, each member (e.g., computing device, Ethernet network device, and/or the like) of a network should be able to generate timestamps indicating precisely when a data packet (e.g., a message and/or the like) was sent to the network or received from the network. For example, such timestamps may be appended to data packets that are sent on the network, and received timestamps may be compared to the real time at which the packet arrived at the input to a device on the network.

However, communications systems may perform complex transcoding to provide forward error correction (FEC) on the data packets before the data packets are physically sent. As the timestamp may be part of the data packet, such a timestamp may itself be transcoded, and therefore, the timestamp may be finalized at the input of the transcoding. For example, certain physical layer chips (PHYs) perform complex transcoding to provide FEC on the data packets being sent to the network. For example, the timestamp may be generated at a media independent interface (MII) (e.g., the interface between a medium access control (MAC) block and the PHY). Although the timestamp is inserted at this point, the timestamp may represent the time at which the packet will leave the communicating device (e.g., computing device, Ethernet network device, and/or the like) on the physical interface.

It can be difficult to calculate an accurate timestamp before transcoding. For example, between generating the timestamp and the data packet leaving the PHY, the data packet, including the timestamp, must be processed by the physical coding sublayer (PCS) and the physical medium attachment sublayer (PMA). In "two-step" timestamping, the timestamp appended to a current packet may represent the time at which the previous data packet was sent. However, in "one-step" timestamping, the timestamp for the current data packet may be associated with when the current data packet itself will be sent, which must be determined before the current data packet undergoes transcoding. Yet, modern PHYs do not have a fixed latency in either the PCS or the PMA due to their complexity. As such, it can be difficult to accurately determine the delay that will be seen by a data packet including a timestamp at the time when such timestamp is generated.

For example, such communication systems may not have access to an accurate measurement of the time at which each bit is sent out. Measurable times may come on a parallel interface (e.g., MII and/or the like) somewhere before the output of the port. These samples of measureable times, however, may be noisy (e.g., bursty, have random errors, and/or the like) while the data (e.g., data packets, bits thereof, and/or the like) at the output is leaving at a constant rate. Due to the noise (e.g. random error and/or the like) on the time signal, if samples of this raw time signal is used for the timestamp, there may be some error depending on exactly when the sampling happens.

Discontinuities in the time signal may result in inaccuracy of the timestamps. For example, the random noise in the time signal may result in a discontinuity depending on when the sampling happens. Additionally or alternatively, if a device (e.g., computing device, Ethernet network device, and/or the like) adjusts its clock to synchronize the time thereof with other clocks on the network, such adjustment may result in a discontinuity.

SUMMARY

Accordingly, it is an object of the presently disclosed subject matter to provide methods, systems, and computer program products for producing accurate timestamps.

According to non-limiting embodiments, provided is a method for producing accurate timestamps. In some non-limiting embodiments, a method for producing accurate timestamps may include sampling a time of day (TOD) signal to provide a sampled TOD. A previously sampled TOD estimate may be retrieved. An internal TOD estimate may be determined based on the sampled TOD and the previously sampled TOD estimate. A timestamp may be determined based on the internal TOD estimate In some non-limiting embodiments, sampling the TOD signal may include removing a discontinuous time sample from a TOD input signal based on a threshold amount of time to provide an estimated TOD signal. Additionally or alternatively, the estimated TOD signal may be sampled to provide the sampled TOD.

In some non-limiting embodiments, determining the timestamp may include determining the timestamp based on the discontinuous time sample and the internal TOD estimate. In some non-limiting embodiments, the internal TOD estimate may be added to a predetermined time offset to provide a sum. Additionally or alternatively, determining the timestamp may include replacing the discontinuous time sample in the sum to provide the timestamp.

In some non-limiting embodiments, removing the discontinuous time sample may include comparing a current time sample from the TOD signal to a previous time sample from the TOD signal. Additionally or alternatively, a difference between the current time sample and the previous time sample may be determined. Additionally or alternatively, whether the difference between the current time sample and the previous time sample satisfies the threshold amount of time may be determined. Additionally or alternatively, at least one of the current time sample or the difference may be stored as the discontinuous time sample. Additionally or alternatively, the previous time sample may be added to an expected difference to provide the sampled TOD.

In some non-limiting embodiments, determining the timestamp based on the internal TOD estimate may include determining the timestamp based on adding a predetermined time offset to the internal TOD estimate. Additionally or alternatively, the predetermined time offset may be based on an amount of time for a bit to travel from a parallel interface to a serial interface. Additionally or alternatively, the parallel interface may include a media independent interface (MII).

In some non-limiting embodiments, the timestamp may be transcoding into a data packet prior to transmitting the data packet via an output port.

In some non-limiting embodiments, a TOD input signal may be continuously sampled to generate the TOD signal.

In some non-limiting embodiments, determining the internal TOD estimate may include sampling the TOD signal based on a trigger to provide the sampled TOD, and the sampled TOD may include a currently sampled TOD estimate. Additionally or alternatively, the previously sampled TOD estimate may be subtracted from the currently sampled TOD estimate to provide a TOD error signal estimate. Additionally or alternatively, the TOD error signal estimate may be multiplied with a weight factor to provide a result. Additionally or alternatively, a currently estimated slope of the TOD signal may be determined based on a previously estimated slope of the TOD signal and the result. Additionally or alternatively, the currently estimated slope of the TOD signal may be added to the previously sampled TOD estimate to provide the internal TOD estimate.

In some non-limiting embodiments, the currently estimated slope of the TOD signal may include a currently estimated value of a slope of the TOD signal with respect to cycles of the MII.

In some non-limiting embodiments, determining the currently estimated slope of the TOD signal may include adding the previously estimated slope of the TOD signal to the result to provide the currently estimated slope of the TOD signal.

In some non-limiting embodiments, the previously estimated slope of the TOD signal may be multiplied with a second weight factor to provide a second result. Additionally or alternatively, determining the currently estimated slope of the TOD signal may include adding the second result to the result to provide the currently estimated slope of the TOD signal. In some non-limiting embodiments, the weight factor may include a first number less than one and greater than zero. Additionally or alternatively, the second weight factor may include the difference between one and the weight factor. Additionally or alternatively, the second weight factor may be greater than the weight factor.

In some non-limiting embodiments, the trigger may include a time at which valid data arrives at the MII. Additionally or alternatively, sampling the TOD signal may include sampling the TOD signal based on the trigger to provide the currently sampled TOD estimate based on the time at which the valid data arrives at the MII.

In some non-limiting embodiments, the trigger may include a time at which a previous data packet was output from the MII. Additionally or alternatively, sampling the TOD signal may include sampling the TOD signal based on the trigger to provide the currently sampled TOD estimate based on the time at which the previous data packet was output from the MII.

In some non-limiting embodiments, the previously estimated slope of the TOD signal may include a running estimated value of the slope of the TOD signal. Additionally or alternatively, determining the currently estimated slope of the TOD signal may include adding the running estimated value of the slope of the TOD signal to the result to provide the currently estimated slope of the TOD signal. Additionally or alternatively, the running estimated value of the slope of the TOD signal may include an average of the slope of the TOD signal over a predetermined time interval.

In some non-limiting embodiments, the previously estimated slope of the TOD signal may include an initialized value of the slope of the TOD signal. Additionally or alternatively, determining the currently estimated slope of the TOD signal may include adding the initialized value of the slope of the TOD signal to the result to provide the currently estimated slope of the TOD signal.

In some non-limiting embodiments, a marker associated with a previous data packet may be communicated to an output port. Additionally or alternatively, a number of cycles since communicating the marker may be counted. Additionally or alternatively, a side channel signal associated with the marker being transmitted via the output port may be received. Additionally or alternatively, the TOD signal may be sampled based on receiving the side channel signal to provide the previously sampled TOD estimate. Additionally or alternatively, the previously sampled TOD estimate may be stored (e.g., for subsequent retrieval). In some non-limiting embodiments, determining the internal TOD estimate may include multiplying the number of cycles with an estimated slope of the TOD signal with respect to cycles to provide a product. Additionally or alternatively, the product may be added to the previously sampled TOD estimate to provide the internal TOD estimate.

According to non-limiting embodiments, provided is a system for producing accurate timestamps. In some non-limiting embodiments, the system for producing accurate timestamps may include at least one Ethernet network device. The Ethernet network device(s) may include a medium access control (MAC) block, the MII, and a physical layer chip (PHY). The MAC block may communicate a data packet and the TOD signal. The MII may receive (e.g., from the MAC block) the data packet and the TOD signal, sample the TOD signal to provide a sampled TOD, retrieve a previously sampled TOD estimate, determine an internal TOD estimate based on the sampled TOD and the previously sampled TOD estimate, and/or determine a timestamp based on the internal TOD estimate. The PHY may transcode the timestamp into a data packet prior to transmitting the data packet via an output port.

In some non-limiting embodiments, sampling the TOD signal may include removing a discontinuous time sample from a TOD input signal based on a threshold amount of time to provide an estimated TOD signal. Additionally or alternatively, the estimated TOD signal may be sampled to provide the sampled TOD.

In some non-limiting embodiments, determining the timestamp may include determining the timestamp based on the discontinuous time sample and the internal TOD estimate. In some non-limiting embodiments, the MII may add the internal TOD estimate to a predetermined time offset to provide a sum. Additionally or alternatively, determining the timestamp may include replacing the discontinuous time sample in the sum to provide the timestamp.

In some non-limiting embodiments, removing the discontinuous time sample may include comparing a current time sample from the TOD signal to a previous time sample from the TOD signal. Additionally or alternatively, a difference between the current time sample and the previous time sample may be determined. Additionally or alternatively, whether the difference between the current time sample and the previous time sample satisfies the threshold amount of time may be determined. Additionally or alternatively, at least one of the current time sample or the difference may be stored as the discontinuous time sample. Additionally or alternatively, the previous time sample may be added to an expected difference to provide the sampled TOD.

In some non-limiting embodiments, determining the timestamp based on the internal TOD estimate may include determining the timestamp based on adding a predetermined time offset to the internal TOD estimate. In some non-limiting embodiments, the predetermined time offset may be based on an amount of time for a bit to travel from the MII to the output port of the PHY. Additionally or alternatively, the MII may include a parallel interface and the output port of the PHY may include a serial interface.

In some non-limiting embodiments, the PHY may include a physical coding sublayer (PCS), which may transcode the timestamp into the data packet prior to transmitting the data packet via the output port.

In some non-limiting embodiments, the MII may continuously sample a TOD input signal to generate the TOD signal.

In some non-limiting embodiments, determining the internal TOD estimate may include sampling the TOD signal based on a trigger to provide the sampled TOD. Additionally or alternatively, the sampled TOD may include a currently sampled TOD estimate. In some non-limiting embodiments, the previously sampled TOD estimate may be subtracted from the currently sampled TOD estimate to provide a TOD error signal estimate. Additionally or alternatively, the TOD error signal estimate may be multiplied with a weight factor to provide a result. Additionally or alternatively, a currently estimated slope of the TOD signal may be determined based on a previously estimated slope of the TOD signal and the result. Additionally or alternatively, the currently estimated slope of the TOD signal may be added to the previously sampled TOD estimate to provide the internal TOD estimate.

In some non-limiting embodiments, the currently estimated slope of the TOD signal may include a currently estimated value of a slope of the TOD signal with respect to cycles of the MII.

In some non-limiting embodiments, determining the currently estimated slope of the TOD signal may include adding the previously estimated slope of the TOD signal to the result to provide the currently estimated slope of the TOD signal.

In some non-limiting embodiments, the MII may multiply the previously estimated slope of the TOD signal with a second weight factor to provide a second result. Additionally or alternatively, determining the currently estimated slope of the TOD signal may include adding the second result to the result to provide the currently estimated slope of the TOD signal.

In some non-limiting embodiments, the weight factor may include a first number less than one and greater than zero. Additionally or alternatively, the second weight factor may include the difference between one and the weight factor. Additionally or alternatively, the second weight factor may be greater than the weight factor.

In some non-limiting embodiments, the trigger may include a time at which valid data arrives at the MII. Additionally or alternatively, sampling the TOD signal may include sampling the TOD signal based on the trigger to provide the currently sampled TOD estimate based on the time at which the valid data arrives at the MII.

In some non-limiting embodiments, the trigger may include a time at which a previous data packet was output from the MII. Additionally or alternatively, sampling the TOD signal may include sampling the TOD signal based on the trigger to provide the currently sampled TOD estimate based on the time at which the previous data packet was output from the MII.

In some non-limiting embodiments, the previously estimated slope of the TOD signal may include a running estimated value of the slope of the TOD signal. Additionally or alternatively, determining the currently estimated slope of the TOD signal may include adding the running estimated value of the slope of the TOD signal to the result to provide the currently estimated slope of the TOD signal. Additionally or alternatively, the running estimated value of the slope of the TOD signal may include an average of the slope of the TOD signal over a predetermined time interval.

In some non-limiting embodiments, the previously estimated slope of the TOD signal may include an initialized value of the slope of the TOD signal. Additionally or alternatively, determining the currently estimated slope of the TOD signal may include adding the initialized value of the slope of the TOD signal to the result to provide the currently estimated slope of the TOD signal.

In some non-limiting embodiments, the MII may communicate a marker associated with a previous data packet to the PHY. Additionally or alternatively, the MII may count a number of cycles since communicating the marker. Additionally or alternatively, the MII may receive a side channel signal associated with the marker being transmitted via the output port of the PHY. Additionally or alternatively, the MII may sample the TOD signal based on receiving the side channel signal to provide the previously sampled TOD estimate. Additionally or alternatively, the MII may store the previously sampled TOD estimate. In some non-limiting embodiments, determining the internal TOD estimate may include multiplying the number of cycles with an estimated slope of the TOD signal with respect to cycles to provide a product. Additionally or alternatively, the product may be added to the previously sampled TOD estimate to provide the internal TOD estimate.

According to non-limiting embodiments, provided is a computer program product for producing accurate timestamps. The computer program product may include at least one non-transitory computer-readable medium including one or more instructions that, when executed by at least one processor, cause the at least one processor to sample a TOD signal to provide a sampled TOD. A previously sampled TOD estimate may be retrieved. An internal TOD estimate may be determined based on the sampled TOD and the previously sampled TOD estimate. A timestamp may be determined based on the internal TOD estimate.

In some non-limiting embodiments, sampling the TOD signal may include removing a discontinuous time sample from a TOD input signal based on a threshold amount of time to provide an estimated TOD signal. Additionally or alternatively, the estimated TOD signal may be sampled to provide the sampled TOD.

In some non-limiting embodiments, determining the timestamp may include determining the timestamp based on the discontinuous time sample and the internal TOD estimate. In some non-limiting embodiments, the instructions further cause the at least one processor to add the internal TOD estimate to a predetermined time offset to provide a sum. Additionally or alternatively, determining the timestamp may include replacing the discontinuous time sample in the sum to provide the timestamp.

In some non-limiting embodiments, removing the discontinuous time sample may include comparing a current time sample from the TOD signal to a previous time sample from the TOD signal. Additionally or alternatively, a difference between the current time sample and the previous time sample may be determined. Additionally or alternatively, whether the difference between the current time sample and the previous time sample satisfies the threshold amount of time may be determined. Additionally or alternatively, at least one of the current time sample or the difference may be stored as the discontinuous time sample. Additionally or alternatively, the previous time sample may be added to an expected difference to provide the sampled TOD.

In some non-limiting embodiments, determining the timestamp based on the internal TOD estimate may include determining the timestamp based on adding a predetermined time offset to the internal TOD estimate. In some non-limiting embodiments, the predetermined time offset may be based on an amount of time for a bit to travel from a parallel interface to a serial interface. Additionally or alternatively, the parallel interface may include a MII.

In some non-limiting embodiments, the instructions may further cause the at least one processor to transcode the timestamp into a data packet prior to transmitting the data packet via an output port.

In some non-limiting embodiments, the instructions may further cause the at least one processor to continuously sample a TOD input signal to generate the TOD signal.

In some non-limiting embodiments, determining the internal TOD estimate may include sampling the TOD signal based on a trigger to provide the sampled TOD. Additionally or alternatively, the sampled TOD may include a currently sampled TOD estimate. In some non-limiting embodiments, the previously sampled TOD estimate may be subtracted from the currently sampled TOD estimate to provide a TOD error signal estimate. Additionally or alternatively, the TOD error signal estimate may be multiplied with a weight factor to provide a result. Additionally or alternatively, a currently estimated slope of the TOD signal may be determined based on a previously estimated slope of the TOD signal and the result. Additionally or alternatively, the currently estimated slope of the TOD signal may be added to the previously sampled TOD estimate to provide the internal TOD estimate.

In some non-limiting embodiments, the currently estimated slope of the TOD signal may include a currently estimated value of a slope of the TOD signal with respect to cycles of a MII.

In some non-limiting embodiments, determining the currently estimated slope of the TOD signal may include adding the previously estimated slope of the TOD signal to the result to provide the currently estimated slope of the TOD signal.

In some non-limiting embodiments, the instructions further cause the at least one processor to multiply the previously estimated slope of the TOD signal with a second weight factor to provide a second result. Additionally or alternatively, determining the currently estimated slope of the TOD signal may include adding the second result to the result to provide the currently estimated slope of the TOD signal.

In some non-limiting embodiments, the weight factor may include a first number less than one and greater than zero. Additionally or alternatively, the second weight factor may include the difference between one and the weight factor. Additionally or alternatively, the second weight factor is greater than the weight factor.

In some non-limiting embodiments, the trigger may include a time at which valid data arrives at a MII. Additionally or alternatively, sampling the TOD signal may include sampling the TOD signal based on the trigger to provide the currently sampled TOD estimate based on the time at which the valid data arrives at the MII.

In some non-limiting embodiments, the trigger may include a time at which a previous data packet was output from a MII. Additionally or alternatively, sampling the TOD signal may include sampling the TOD signal based on the trigger to provide the currently sampled TOD estimate based on the time at which the previous data packet was output from the MII.

In some non-limiting embodiments, the previously estimated slope of the TOD signal may include a running estimated value of the slope of the TOD signal. Additionally or alternatively, determining the currently estimated slope of the TOD signal may include adding the running estimated value of the slope of the TOD signal to the result to provide the currently estimated slope of the TOD signal. Additionally or alternatively, the running estimated value of the slope of the TOD signal may include an average of the slope of the TOD signal over a predetermined time interval.

In some non-limiting embodiments, the previously estimated slope of the TOD signal may include an initialized value of the slope of the TOD signal. Additionally or alternatively, determining the currently estimated slope of the TOD signal may include adding the initialized value of the slope of the TOD signal to the result to provide the currently estimated slope of the TOD signal.

In some non-limiting embodiments, the instructions may further direct the at least one processor to communicate a marker associated with a previous data packet to an output port. Additionally or alternatively, a number of cycles since communicating the marker may be counted. Additionally or alternatively, a side channel signal associated with the marker being transmitted via the output port may be received. Additionally or alternatively, the TOD signal may be sampled based on receiving the side channel signal to provide the previously sampled TOD estimate. Additionally or alternatively, the previously sampled TOD estimate may be stored. In some non-limiting embodiments, determining the internal TOD estimate may include multiplying the number of cycles with an estimated slope of the TOD signal with respect to cycles to provide a product. Additionally or alternatively, the product may be added to the previously sampled TOD estimate to provide the internal TOD estimate.

Further embodiments are set forth in the following numbered clauses:

Clause 1: A method for calculating a timestamp associated with a data packet before transcoding of the data packet, comprising: sampling, with at least one processor, a time of day (TOD) signal to provide a sampled TOD; retrieving, with at least one processor, a previously sampled TOD estimate; determining, with at least one processor, an internal TOD estimate based on the sampled TOD and the previously sampled TOD estimate; and determining, with at least one processor, a timestamp based on the internal TOD estimate.

Clause 2: The method of clause 1, wherein sampling the TOD signal comprises: removing, with at least one processor, a discontinuous time sample from a TOD input signal based on a threshold amount of time to provide an estimated TOD signal; and sampling, with at least one processor, the estimated TOD signal to provide the sampled TOD.

Clause 3: The method of clauses 1 or 2, wherein determining the timestamp comprises determining the timestamp based on the discontinuous time sample and the internal TOD estimate.

Clause 4: The method of any preceding clause, further comprising: adding, with at least one processor, the internal TOD estimate to a predetermined time offset to provide a sum, wherein determining the timestamp comprises replacing the discontinuous time sample in the sum to provide the timestamp.

Clause 5: The method of any preceding clause, wherein removing the discontinuous time sample comprises: comparing a current time sample from the TOD signal to a previous time sample from the TOD signal; determining a difference between the current time sample and the previous time sample; determining whether the difference between the current time sample and the previous time sample satisfies the threshold amount of time; storing at least one of the current time sample or the difference as the discontinuous time sample; and adding the previous time sample to an expected difference to provide the sampled TOD.

Clause 6: The method of any preceding clause, wherein determining the timestamp based on the internal TOD estimate comprises determining the timestamp based on adding a predetermined time offset to the internal TOD estimate.

Clause 7: The method of any preceding clause, wherein the predetermined time offset is based on an amount of time for a bit to travel from a parallel interface to a serial interface.

Clause 8: The method of any preceding clause, wherein the parallel interface comprises a media independent interface (MII).

Clause 9: The method of any preceding clause, further comprising: transcoding, with at least one processor, the timestamp into a data packet prior to transmitting the data packet via an output port.

Clause 10: The method of any preceding clause, further comprising: continuously sampling, with at least one processor, a TOD input signal to generate the TOD signal.

Clause 11: The method of any preceding clause, wherein determining the internal TOD estimate comprises: sampling, with at least one processor, the TOD signal based on a trigger to provide the sampled TOD, the sampled TOD comprising a currently sampled TOD estimate; subtracting, with at least one processor, the previously sampled TOD estimate from the currently sampled TOD estimate to provide a TOD error signal estimate; multiplying, with at least one processor, the TOD error signal estimate with a weight factor to provide a result; determining, with at least one processor, a currently estimated slope of the TOD signal based on a previously estimated slope of the TOD signal and the result; and adding, with at least one processor, the currently estimated slope of the TOD signal to the previously sampled TOD estimate to provide the internal TOD estimate.

Clause 12: The method of any preceding clause, wherein the currently estimated slope of the TOD signal comprises a currently estimated value of a slope of the TOD signal with respect to cycles of a media independent interface (MII).

Clause 13: The method of any preceding clause, wherein determining the currently estimated slope of the TOD signal comprises adding the previously estimated slope of the TOD signal to the result to provide the currently estimated slope of the TOD signal.

Clause 14: The method of any preceding clause, further comprising multiplying the previously estimated slope of the TOD signal with a second weight factor to provide a second result, wherein determining the currently estimated slope of the TOD signal comprises adding the second result to the result to provide the currently estimated slope of the TOD signal.

Clause 15: The method of any preceding clause, wherein the weight factor comprises a first number less than one and greater than zero, the second weight factor comprises a difference between one and the weight factor, and wherein the second weight factor is greater than the weight factor.

Clause 16: The method of any preceding clause, wherein the trigger comprises a time at which valid data arrives at a media independent interface (MII) and wherein sampling the TOD signal comprises: sampling the TOD signal based on the trigger to provide the currently sampled TOD estimate based on the time at which the valid data arrives at the MII.

Clause 17: The method of any preceding clause, wherein the trigger comprises a time at which a previous data packet was output from a media independent interface (MII) and wherein sampling the TOD signal comprises: sampling the TOD signal based on the trigger to provide the currently sampled TOD estimate based on the time at which the previous data packet was output from the MII.

Clause 18: The method of any preceding clause, wherein the previously estimated slope of the TOD signal comprises a running estimated value of the slope of the TOD signal, wherein determining the currently estimated slope of the TOD signal comprises: adding the running estimated value of the slope of the TOD signal to the result to provide the currently estimated slope of the TOD signal, wherein the running estimated value of the slope of the TOD signal comprises an average of the slope of the TOD signal over a predetermined time interval.

Clause 19: The method of any preceding clause, wherein the previously estimated slope of the TOD signal comprises an initialized value of the slope of the TOD signal, wherein determining the currently estimated slope of the TOD signal comprises: adding the initialized value of the slope of the TOD signal to the result to provide the currently estimated slope of the TOD signal.

Clause 20: The method of any preceding clause, further comprising: communicating, with at least one processor, a marker associated with a previous data packet to an output port; counting, with at least one processor, a number of cycles since communicating the marker; receiving, with at least one processor, a side channel signal associated with the marker being transmitted via the output port; sampling, with at least one processor, the TOD signal based on receiving the side channel signal to provide the previously sampled TOD estimate; and storing, with at least one processor, the previously sampled TOD estimate, wherein determining the internal TOD estimate comprises: multiplying, with at least one processor, the number of cycles with an estimated slope of the TOD signal with respect to cycles to provide a product; adding, with at least one processor, the product to the previously sampled TOD estimate to provide the internal TOD estimate.

Clause 21: A system, comprising: at least one Ethernet network device, comprising: a medium access control (MAC) block configured to communicate a data packet and a time of day (TOD) signal; a media independent interface (MII) configured to: receive, from the MAC block, the data packet and the TOD signal; sample the TOD signal to provide a sampled TOD; retrieve a previously sampled TOD estimate; determine an internal TOD estimate based on the sampled TOD and the previously sampled TOD estimate; and determine a timestamp based on the internal TOD estimate; and a physical layer chip (PHY) configured to transcode the timestamp into a data packet prior to transmitting the data packet via an output port.

Clause 22: The system of clause 21, wherein sampling the TOD signal comprises: removing a discontinuous time sample from a TOD input signal based on a threshold amount of time to provide an estimated TOD signal; and sampling the estimated TOD signal to provide the sampled TOD.

Clause 23: The system of clauses 21 or 22, wherein determining the timestamp comprises determining the timestamp based on the discontinuous time sample and the internal TOD estimate.

Clause 24: The system of any one of clauses 21-23, wherein the MII is further configured to: add the internal TOD estimate to a predetermined time offset to provide a sum, wherein determining the timestamp comprises replacing the discontinuous time sample in the sum to provide the timestamp.

Clause 25: The system of any one of clauses 21-24, wherein removing the discontinuous time sample comprises: comparing a current time sample from the TOD signal to a previous time sample from the TOD signal; determining a difference between the current time sample and the previous time sample; determining whether the difference between the current time sample and the previous time sample satisfies the threshold amount of time; storing at least one of the current time sample or the difference as the discontinuous time sample; and adding the previous time sample to an expected difference to provide the sampled TOD.

Clause 26: The system of any one of clauses 21-25, wherein determining the timestamp based on the internal TOD estimate comprises determining the timestamp based on adding a predetermined time offset to the internal TOD estimate.

Clause 27: The system of any one of clauses 21-26, wherein the predetermined time offset is based on an amount of time for a bit to travel from the MII to the output port of the PHY.

Clause 28: The system of any one of clauses 21-27, wherein the MII comprises a parallel interface and wherein the output port of the PHY comprises a serial interface.

Clause 29: The system of any one of clauses 21-28, wherein the PHY comprises a physical coding sublayer (PCS) configured to transcode the timestamp into the data packet prior to transmitting the data packet via the output port.

Clause 30: The system of any one of clauses 21-29, wherein the MII is further configured to continuously sample a TOD input signal to generate the TOD signal.

Clause 31: The system of any one of clauses 21-30, wherein determining the internal TOD estimate comprises: sampling the TOD signal based on a trigger to provide the sampled TOD, the sampled TOD comprising a currently sampled TOD estimate; subtracting the previously sampled TOD estimate from the currently sampled TOD estimate to provide a TOD error signal estimate; multiplying the TOD error signal estimate with a weight factor to provide a result; determining a currently estimated slope of the TOD signal based on a previously estimated slope of the TOD signal and the result; and adding the currently estimated slope of the TOD signal to the previously sampled TOD estimate to provide the internal TOD estimate.

Clause 32: The system of any one of clauses 21-31, wherein the currently estimated slope of the TOD signal comprises a currently estimated value of a slope of the TOD signal with respect to cycles of the MII.

Clause 33: The system of any one of clauses 21-32, wherein determining the currently estimated slope of the TOD signal comprises adding the previously estimated slope of the TOD signal to the result to provide the currently estimated slope of the TOD signal.

Clause 34: The system of any one of clauses 21-33, wherein the MII is further configured to multiply the previously estimated slope of the TOD signal with a second weight factor to provide a second result, wherein determining the currently estimated slope of the TOD signal comprises adding the second result to the result to provide the currently estimated slope of the TOD signal.

Clause 35: The system of any one of clauses 21-34, wherein the weight factor comprises a first number less than one and greater than zero, the second weight factor comprises a difference between one and the weight factor, and wherein the second weight factor is greater than the weight factor.

Clause 36: The system of any one of clauses 21-35, wherein the trigger comprises a time at which valid data arrives at the MII and wherein sampling the TOD signal comprises: sampling the TOD signal based on the trigger to provide the currently sampled TOD estimate based on the time at which the valid data arrives at the MII.

Clause 37: The system of any one of clauses 21-36, wherein the trigger comprises a time at which a previous data packet was output from the MII and wherein sampling the TOD signal comprises: sampling the TOD signal based on the trigger to provide the currently sampled TOD estimate based on the time at which the previous data packet was output from the MII.

Clause 38: The system of any one of clauses 21-37, wherein the previously estimated slope of the TOD signal comprises a running estimated value of the slope of the TOD signal, wherein determining the currently estimated slope of the TOD signal comprises: adding the running estimated value of the slope of the TOD signal to the result to provide the currently estimated slope of the TOD signal, wherein the running estimated value of the slope of the TOD signal comprises an average of the slope of the TOD signal over a predetermined time interval.

Clause 39: The system of any one of clauses 21-38, wherein the previously estimated slope of the TOD signal comprises an initialized value of the slope of the TOD signal, wherein determining the currently estimated slope of the TOD signal comprises: adding the initialized value of the slope of the TOD signal to the result to provide the currently estimated slope of the TOD signal.

Clause 40: The system of any one of clauses 21-39, wherein the MII is further configured to: communicate a marker associated with a previous data packet to the PHY; count a number of cycles since communicating the marker; receive a side channel signal associated with the marker being transmitted via the output port of the PHY; sample the TOD signal based on receiving the side channel signal to provide the previously sampled TOD estimate; and store the previously sampled TOD estimate, wherein determining the internal TOD estimate comprises: multiplying the number of cycles with an estimated slope of the TOD signal with respect to cycles to provide a product; and adding the product to the previously sampled TOD estimate to provide the internal TOD estimate.

Clause 41: A computer program product for calculating a timestamp associated with a data packet before transcoding of the data packet, the computer program product comprising at least one non-transitory computer-readable medium including one or more instructions that, when executed by at least one processor, cause the at least one processor to: sample a time of day (TOD) signal to provide a sampled TOD; retrieve a previously sampled TOD estimate; determine an internal TOD estimate based on the sampled TOD and the previously sampled TOD estimate; and determine a timestamp based on the internal TOD estimate.

Clause 42: The computer program product of clause 41, wherein sampling the TOD signal comprises: removing a discontinuous time sample from a TOD input signal based on a threshold amount of time to provide an estimated TOD signal; and sampling the estimated TOD signal to provide the sampled TOD.

Clause 43: The computer program product of clauses 41 or 42, wherein determining the timestamp comprises determining the timestamp based on the discontinuous time sample and the internal TOD estimate.

Clause 44: The computer program product of any one of clauses 41-43, wherein the instructions further cause the at least one processor to: add the internal TOD estimate to a predetermined time offset to provide a sum, wherein determining the timestamp comprises replacing the discontinuous time sample in the sum to provide the timestamp.

Clause 45: The computer program product of any one of clauses 41-44, wherein removing the discontinuous time sample comprises: comparing a current time sample from the TOD signal to a previous time sample from the TOD signal; determining a difference between the current time sample and the previous time sample; determining whether the difference between the current time sample and the previous time sample satisfies the threshold amount of time; storing at least one of the current time sample or the difference as the discontinuous time sample; and adding the previous time sample to an expected difference to provide the sampled TOD.

Clause 46: The computer program product of any one of clauses 41-45, wherein determining the timestamp based on the internal TOD estimate comprises determining the timestamp based on adding a predetermined time offset to the internal TOD estimate.

Clause 47: The computer program product of any one of clauses 41-46, wherein the predetermined time offset is based on an amount of time for a bit to travel from a parallel interface to a serial interface.

Clause 48: The computer program product of any one of clauses 41-47, wherein the parallel interface comprises a media independent interface (MII).

Clause 49: The computer program product of any one of clauses 41-48, wherein the instructions further cause the at least one processor to: transcode the timestamp into a data packet prior to transmitting the data packet via an output port.

Clause 50: The computer program product of any one of clauses 41-49, wherein the instructions further cause the at least one processor to: continuously sample a TOD input signal to generate the TOD signal.

Clause 51: The computer program product of any one of clauses 41-50, wherein determining the internal TOD estimate comprises: sampling the TOD signal based on a trigger to provide the sampled TOD, the sampled TOD comprising a currently sampled TOD estimate; subtracting the previously sampled TOD estimate from the currently sampled TOD estimate to provide a TOD error signal estimate; multiplying the TOD error signal estimate with a weight factor to provide a result; determining a currently estimated slope of the TOD signal based on a previously estimated slope of the TOD signal and the result; and adding the currently estimated slope of the TOD signal to the previously sampled TOD estimate to provide the internal TOD estimate.

Clause 52: The computer program product of any one of clauses 41-51, wherein the currently estimated slope of the TOD signal comprises a currently estimated value of a slope of the TOD signal with respect to cycles of a media independent interface (MII).

Clause 53: The computer program product of any one of clauses 41-52, wherein determining the currently estimated slope of the TOD signal comprises adding the previously estimated slope of the TOD signal to the result to provide the currently estimated slope of the TOD signal.

Clause 54: The computer program product of any one of clauses 41-53, wherein the instructions further cause the at least one processor to multiply the previously estimated slope of the TOD signal with a second weight factor to provide a second result, wherein determining the currently estimated slope of the TOD signal comprises adding the second result to the result to provide the currently estimated slope of the TOD signal.

Clause 55: The computer program product of any one of clauses 41-54, wherein the weight factor comprises a first number less than one and greater than zero, the second weight factor comprises a difference between one and the weight factor, and wherein the second weight factor is greater than the weight factor.

Clause 56: The computer program product of any one of clauses 41-55, wherein the trigger comprises a time at which valid data arrives at a media independent interface (MII) and wherein sampling the TOD signal comprises: sampling the TOD signal based on the trigger to provide the currently sampled TOD estimate based on the time at which the valid data arrives at the MII.

Clause 57: The computer program product of any one of clauses 41-56, wherein the trigger comprises a time at which a previous data packet was output from a media independent interface (MII) and wherein sampling the TOD signal comprises: sampling the TOD signal based on the trigger to provide the currently sampled TOD estimate based on the time at which the previous data packet was output from the MII.

Clause 58: The computer program product of any one of clauses 41-57, wherein the previously estimated slope of the TOD signal comprises a running estimated value of the slope of the TOD signal, wherein determining the currently estimated slope of the TOD signal comprises: adding the running estimated value of the slope of the TOD signal to the result to provide the currently estimated slope of the TOD signal, wherein the running estimated value of the slope of the TOD signal comprises an average of the slope of the TOD signal over a predetermined time interval.

Clause 59: The computer program product of any one of clauses 41-58, wherein the previously estimated slope of the TOD signal comprises an initialized value of the slope of the TOD signal, wherein determining the currently estimated slope of the TOD signal comprises: adding the initialized value of the slope of the TOD signal to the result to provide the currently estimated slope of the TOD signal.

Clause 60: The computer program product of any one of clauses 41-59, wherein the instructions further direct the at least one processor to: communicate a marker associated with a previous data packet to an output port; count a number of cycles since communicating the marker; receive a side channel signal associated with the marker being transmitted via the output port; sample the TOD signal based on receiving the side channel signal to provide the previously sampled TOD estimate; and store the previously sampled TOD estimate, wherein determining the internal TOD estimate comprises: multiplying the number of cycles with an estimated slope of the TOD signal with respect to cycles to provide a product; and adding the product to the previously sampled TOD estimate to provide the internal TOD estimate.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIG. 1A is a diagram of a non-limiting embodiment of an environment in which methods, systems, and/or computer program products, described herein, may be implemented, according to the principles of the presently disclosed subject matter;

DESCRIPTION

Figure 1B:
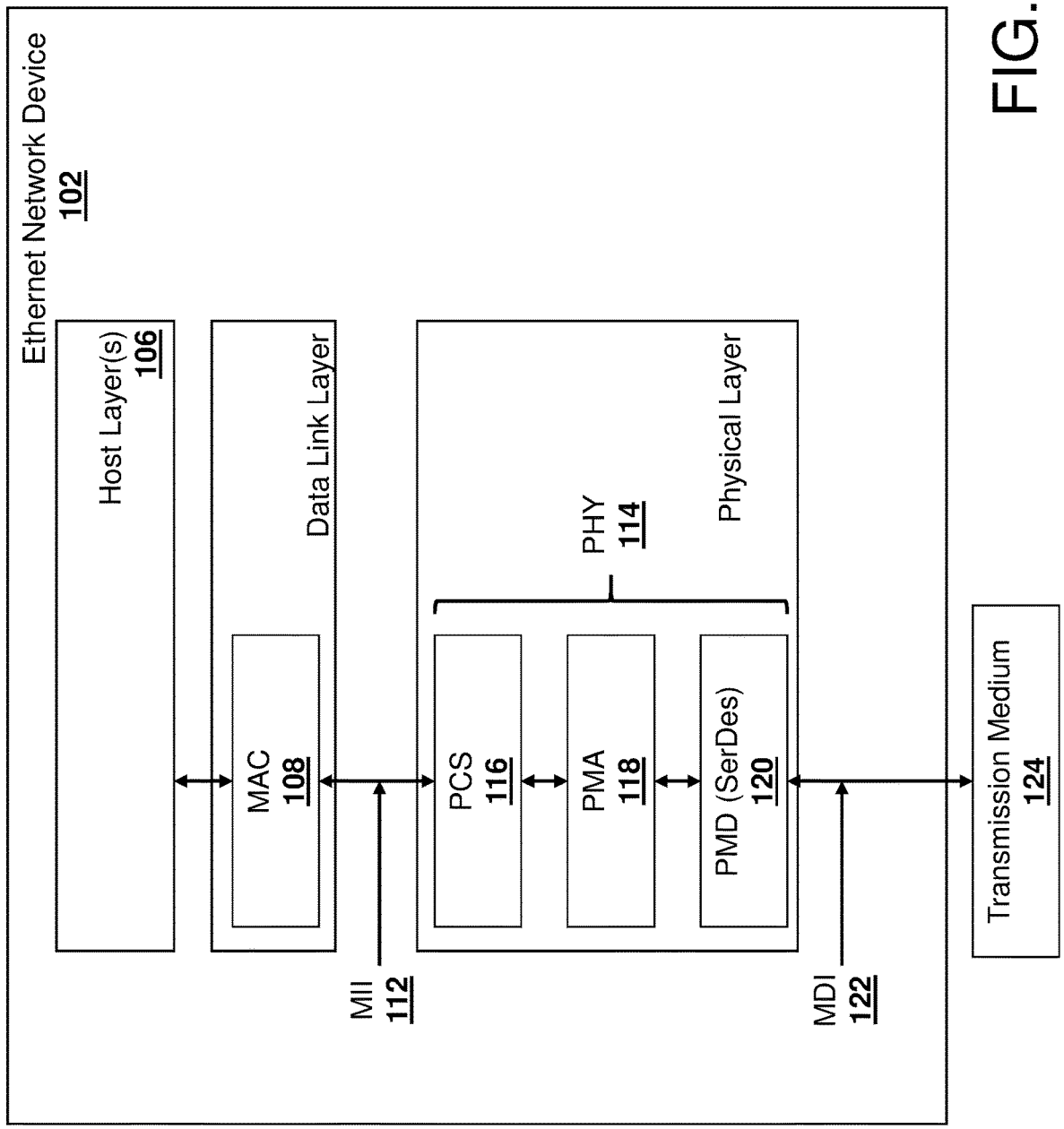
FIG. 1B is a diagram of a non-limiting embodiment of an architecture of an Ethernet network device shown in FIG. 1A, according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "circuitry" may refer to one or more electronic components that may include digital circuitry, analog circuitry, software, firmware, any combination thereof, and/or the like.

As used herein, the term "server" may refer to one or more computing devices (e.g., processors, storage devices, similar computer components, and/or the like) that communicate with other computing devices over a network (e.g., a public network, the Internet, a private network, and/or the like) and, in some examples, facilitate communication among other servers and/or computing devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to systems, methods, and computer program products for producing accurate timestamps, including, but not limited to, producing accurate timestamps (e.g., IEEE 1588 PTP timestamps and/or the like) in a system with variable physical (PHY) layer latency. For example, non-limiting embodiments of the disclosed subject matter provide sampling a time of day (TOD) signal, determining an internal TOD estimate based on the sampled TOD and a previously sampled TOD estimate (e.g., based on a slope of the TOD signal with respect to cycles and/or bits transmitted on the physical interface), and determining a timestamp based on the internal TOD estimate. Such embodiments provide techniques and systems that enable determining an accurate and precise timestamp based on not only sampling the TOD signal (e.g., which may be noisy, may have discontinuities therein, and/or the like) but also the previously sampled TOD estimate and a running estimate of the relationship between the TOD signal and data items (e.g., slope of the TOD signal with respect to cycles and/or bits transmitted on the physical interface), which provides consistency and precision between consecutive timestamps (e.g., the previously sampled TOD estimate and the (current) timestamp). As such, the timestamps may be accurate and precise even though the latency (e.g., the time it takes to propagate from a media independent interface (MII) to the output port of the PHY, including any transcoding, serializing, and/or the like at the PHY) for a data item (e.g., a data packet, a bit thereof, and/or the like) is not fixed, since the latency may be estimated based on the relationship between the TOD signal and data items (e.g., slope of the TOD signal with respect to cycles and/or bits transmitted on the physical interface). Additionally, the timestamps may be accurate and precise even though the TOD signal is noisy, since any discontinuities therein may be removed and/or compensated for with respect to the previously sampled TOD estimate and the relationship between the TOD signal and data items (e.g., slope of the TOD signal and/or the like) and/or since the running estimate of the relationship between the TOD signal and data items may gradually adjust over time towards an accurate value without being overly influenced by the discontinuity (e.g., using weighting so that the difference between the sampled TOD and the previously sampled TOD estimate does not overly influence the running estimate of the relationship (e.g., slope)). Such embodiments provide techniques and systems that enable determining an accurate and precise timestamp based on sampling the current time and adding the multiplication product of amount of time it takes to send data (e.g., a data packet, a bit thereof, and/or the like) and the amount of data (e.g., number of data packets, number of bits thereof, and/or the like) that still needs to be sent before the current packet is sent out. Additionally or alternatively, such embodiments provide techniques and systems that enable determination of an accurate measurement of the real time between every item of data (e.g., a data packet, a bit thereof, and/or the like) sent or received at the physical interface, an accurate measurement of how much data (e.g., number of data items and/or the like) has passed the timestamping point but has not been sent out (e.g., in the transmission direction), and/or an accurate measurement of how much data was processed before a received item of data (e.g., in the reception direction). Additionally or alternatively, such embodiments provide techniques and systems that enable accurately estimating the TOD because, although this sampled TOD signal may be noisy, the sampled TOD signal may center around an accurate value, and therefore, using a running estimate of this TOD signal (e.g., the slope thereof and/or the like) may produce an accurate estimate of the time between each item of data (e.g., a data packet, a bit thereof, and/or the like) on the output port (e.g., due to averaging, weighted averaging, convergence over time, and/or the like). Such a running estimate may be based on the amount of time between items of data (e.g., data packets, bits thereof, and/or the like) on the output of the device, the time it takes for an item of data to propagate from the parallel interface (e.g., the MII and/or the like) to the output port (e.g., the time it takes for the item of data to be transcoded, serialized, and/or the like by the PHY), and/or the like. Additionally or alternatively, such embodiments provide techniques and systems that enable estimation of the amount of time between items of data (e.g., data packets, bits thereof, and/or the like) at the output port based on measuring the error (e.g., difference and/or the like) between the sampled time at the parallel interface and an internal estimate. Additionally or alternatively, such embodiments provide techniques and systems that enable multiple techniques for measuring the time it takes for an item of data (e.g., a data packet, a bit thereof, and/or the like) to propagate between the parallel interface (e.g., the MII and/or the like) and the output port (e.g., the time it takes for the item of data to be transcoded, serialized, and/or the like by the PHY), e.g., sending a marker (e.g., marker bit, alignment marker, and/or the like) through the system (e.g., from the parallel interface to the output port and/or the like) and taking a sample of the time (e.g., the TOD signal) when the marker bit is reported (e.g., based on a side channel signal and/or the like) to have left at the output port (e.g., serial interface, medium dependent interface MDI), and/or the like); using a running estimate (e.g., slope, weighted iterative addition, weighted average, integral term, and/or the like) to a component (e.g., circuitry, filter, and/or the like) estimating the time gap between items of data (e.g., data packets, bits thereof, and/or the like) to provide an estimate for the amount of time it takes an item of data to propagate through the pipeline (e.g., through the PHY to the output port and/or the like); and/or the like. As such, based on such an accurate estimate of the time between items of data (e.g., data packets, bits thereof, and/or the like) and such an accurate estimate of the time it takes an item of data to propagate from the parallel interface (e.g., the MII and/or the like) to the serial interface (e.g., the MDI, the output port, and/or the like), an accurate timestamp for any given item of data may be generated (e.g., by adding the current sampled/estimated TOD to the internal estimate of the time between bits and the amount of time it takes an item of data to propagate from the parallel to serial interface and/or the like). Additionally or alternatively, such embodiments provide techniques and systems that enable accurate estimation of the sampled time signal (e.g., TOD signal and/or the like) by removing and/or adjusting for detected discontinuities (e.g., based on satisfying at least one threshold), whether the discontinuity is based on noise (e.g., random error in the sampled TOD signal and/or the like) and/or an update of the clock based on synchronization, to maintain timestamp accuracy over such discontinuities. Additionally or alternatively, such embodiments provide techniques and systems that enable an accurate estimate of the latency (e.g., the time it takes for an item of data to propagate from the parallel interface (e.g., the MII) to the output port (e.g., of the PHY) and/or the like) that will be experienced by a specific item of data at a timestamping point (e.g., the MII and/or the like) so that projected latency can be added to the sampled/estimated TOD at the timestamping point to determine an accurate timestamp based thereon. Additionally or alternatively, such embodiments provide techniques and systems that enable accurate determination of a timestamp, which may be used for both one-step and two-step timestamping of data items (e.g., data packets and/or the like).

For the purpose of illustration, in the following description, while the presently disclosed subject matter is described with respect to methods, systems, and computer program products for producing accurate timestamps, e.g., IEEE 1588 PTP timestamps and/or the like in a system with variable PHY latency, one skilled in the art will recognize that the disclosed subject matter is not limited to the illustrative embodiments. For example, the methods, systems, and computer program products described herein may be used with a wide variety of settings, such as producing accurate timestamps in any setting suitable for using such timestamps, e.g., telecommunication, wireless communication, wired communication, and/or the like.

Referring now to FIG. 1A, FIG. 1A is a diagram of a non-limiting embodiment of an environment 100 in which systems, devices, computer program products, and methods, described herein, may be implemented. As shown in FIG. 1A, environment 100 includes Ethernet network devices 102-1 through 102-N (referred to collectively as "Ethernet network devices 102," and individually as "Ethernet network device 102") and communication network 104. Systems and/or devices of environment 100 (e.g., Ethernet network device 102-1 and Ethernet network device 102-2, Ethernet network device 102-1 and Ethernet network device 102-N, etc.) may interconnect via wired connections, wireless connections, or a combination of wired and wireless connections.

In some non-limiting embodiments, Ethernet network device 102 includes one or more devices capable of transmitting and/or receiving data units (e.g., data packets, bits thereof, messages (e.g., control messages), any combination thereof, and/or the like) according to an Ethernet network technology, determining information associated with the data units, and/or the like. For example, Ethernet network device 102 may include a network interface card (NIC); a computing device, such as a server, a desktop computer, a laptop, and/or a mobile device (e.g., smart phone, tablet, and/or the like); and/or the like. Further details regarding non-limiting embodiments of Ethernet network device 102 are provided below with regard to FIGS. 1B and 2.

In some non-limiting embodiments, communication network 104 may include one or more wired and/or wireless networks. For example, communication network 104 may include a communications link, a computer network, an Internet Protocol (IP) network, an Ethernet network, a bus network, a fiber optic-based network, a local area network (LAN), a wide area network (WAN), a metropolitan area network (MAN), a telephone network (e.g., the public switched telephone network (PSTN)), a private network, an ad hoc network, an intranet, the Internet, a cloud computing network, a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), and/or the like, and/or a combination of these or other types of networks. In some non-limiting embodiments, communication network 104 may interconnect a plurality of Ethernet network devices 102.

The number and arrangement of systems, devices, and networks shown in FIG. 1A are provided as an example. There may be additional devices and/or networks, fewer devices and/or networks, different devices and/or networks, or differently arranged devices and/or networks than those shown in FIG. 1A. Furthermore, two or more devices shown in FIG. 1A may be implemented within a single device, or a single device shown in FIG. 1A may be implemented as multiple, distributed devices. Additionally or alternatively, a set of systems or a set of devices (e.g., one or more systems, one or more devices) of environment 100 may perform one or more functions described as being performed by another set of systems or another set of devices of environment 100.

Referring now to FIG. 1B, FIG. 1B is a diagram of an example architecture of Ethernet network device 102. In some non-limiting embodiments, the architecture of Ethernet network device 102 may be associated with IEEE standard 802.3 (e.g., IEEE 802.3-2018—IEEE Standard for Ethernet, IEEE (2018) and/or approved amendments thereto, the disclosures of which are hereby incorporated by reference in their entireties). Additionally or alternatively, as shown in FIG. 1B, Ethernet network device 102 may include host layer(s) 106, medium access control (MAC) block 108, media independent interface (MII) 112, physical layer chip (PHY) 114, and medium dependent interface (MDI) 122.

Host layer(s) 106 may include one or more devices, one or more components, and/or functionality that control hardware components of Ethernet network device 102 that are responsible for implementing layers of the Open Systems Interconnection (OSI) model above the MAC layer. For example, host layer(s) 106 may include an application layer, a presentation layer, a session layer, a transport layer, a network layer, at least a portion of a data link layer (e.g., the logical link control (LLC) sublayer and/or the like), and/or the like. Additionally or alternatively, host layer(s) 106 may be implemented in at least one non-transitory computer-readable medium including one or more instructions that, when executed by at least one processor, cause the at least one processor to perform the function(s) of such layers.

MAC block 108 may include one or more data link layer devices, one or more components, circuitry, and/or functionality that control hardware components of Ethernet network device 102 that are responsible for interaction with transmission medium 124. In some non-limiting embodiments, MII 112 may include one or more devices, one or more components, and/or functionality for connecting PHY 114 to MAC block 108. In some non-limiting embodiments, MII 112 may include timestamping circuitry (e.g., a timestamp unit (TSU), circuitry, one or more devices, one or more components, and/or functionality) determining timestamps for, communicating timestamps with, and/or appending timestamps to data units (e.g., e.g., data packets, bits thereof, messages (e.g., control messages), any combination thereof, and/or the like), as described herein.

PHY 114 may include physical coding sublayer (PCS) block 116, physical medium attachment (PMA) block 118, and physical medium dependent (PMD) block 120. In some non-limiting embodiments, PHY 114 may include circuitry, one or more physical layer devices, one or more components, and/or functionality that implement physical layer operations, such as providing analog signal physical access to an Ethernet communication link. In some non-limiting embodiments, MDI 122 may include one or more devices, one or more components, one or more ports (e.g., output port(s)), and/or functionality that provide an interface between PHY 114 and transmission medium 124. In some non-limiting embodiments, transmission medium 124 may include a physical medium (e.g., a cable such as coaxial cable, fiber optic cable, twisted pair cable, etc.) over which the Ethernet communication link is established, such that packets are transmitted and received via the physical medium.

PCS block 116 may include an encoder block, a scrambler block, a mapper block, a decoder block, a descrambler block, and/or a block synchronization function. In some non-limiting embodiments, each of the encoder block, the scrambler block, the mapper block, the decoder block, the descrambler block, and the block synchronization function may include circuitry, one or more devices, one or more components, and/or functionality as described in IEEE standard 802.3. For example, the encoder block and/or the decoder block may be capable of performing operations associated with an encoding/decoding scheme (e.g., 64b/66b encoding/decoding scheme and/or the like). Additionally or alternatively, the scrambler block may be capable of performing operations associated with scrambling bits of a data item (e.g., data packet, payload thereof, and/or the like), and/or the descrambler block may be capable of performing operations associated with processing a received data item to reverse the effect of the scrambler block. Additionally or alternatively, the mapper may map bits to symbols (e.g., 3 bits-2 ternary symbols (3B2T) mapping and/or the like). Additionally or alternatively, the block synchronization function may synchronize (e.g., obtain block lock to) blocks of bits (e.g., that are a preselected size, such as 66-bits in size and/or the like) in a bit stream using synchronization headers of the blocks of bits and the block synchronization function may output blocks of bits (e.g., 66-bit blocks and/or the like) based on synchronizing the blocks of bits.

In some non-limiting embodiments, PMD block 120 may include a serializer/deserializer (SerDes) block. For example, the SerDes block may include circuitry, one or more devices, one or more components, and/or functionality associated with receiving packets as a parallel input in the form of a set of bits (e.g., 16 bits) and providing a serial output in the form of a serial bit stream, receiving packets in the form of a serial bit stream and providing a parallel output in the form of a set of bits (e.g., 16 bits), and/or the like. In some non-limiting embodiments, the SerDes block may include at least one standalone component of PHY 114, may be included in another component of PHY 114 (e.g., PMA 118 and/or the like), and/or the like.

The number and arrangement of components shown in FIG. 1B are provided as an example. There may be additional components, fewer components, different components, or differently arranged components than those shown in FIG. 1B. Furthermore, two or more components shown in FIG. 1B may be implemented within a single component, or a single component shown in FIG. 1B may be implemented as multiple, distributed components. Additionally or alternatively, a set of components (e.g., one or more components) of Ethernet network device 102 may perform one or more functions described as being performed by another set of components of Ethernet network device 102.

Figure 2:
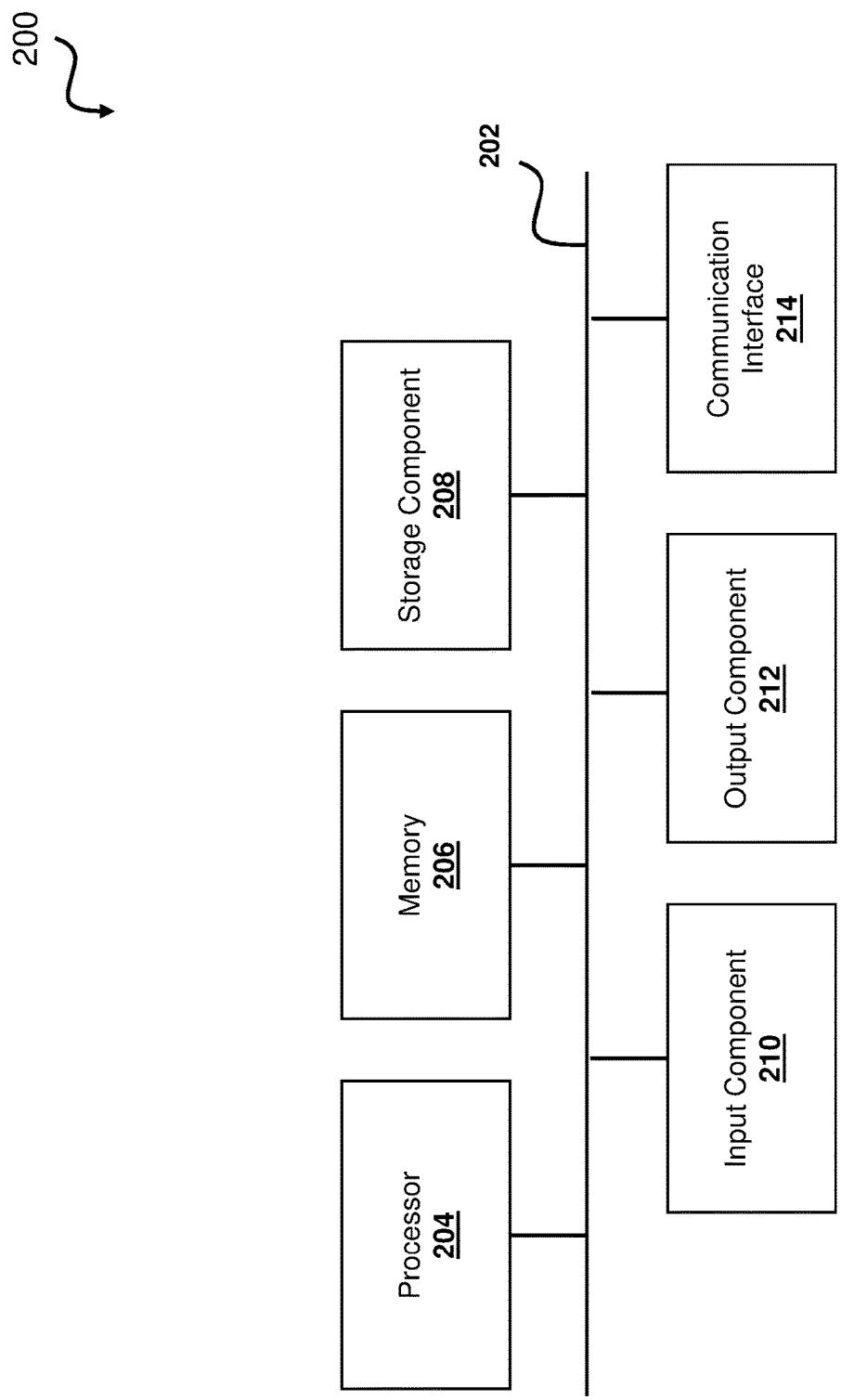
FIG. 2 is a diagram of a non-limiting embodiment of components of one or more devices of FIGS. 1A and 1B, according to the principles of the presently disclosed subject matter.

Referring now to FIG. 2, FIG. 2 is a diagram of example components of a device 200. Device 200 may correspond to one or more Ethernet network devices 102 or one or more components of Ethernet network device 102. In some non-limiting embodiments, Ethernet network device 102 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
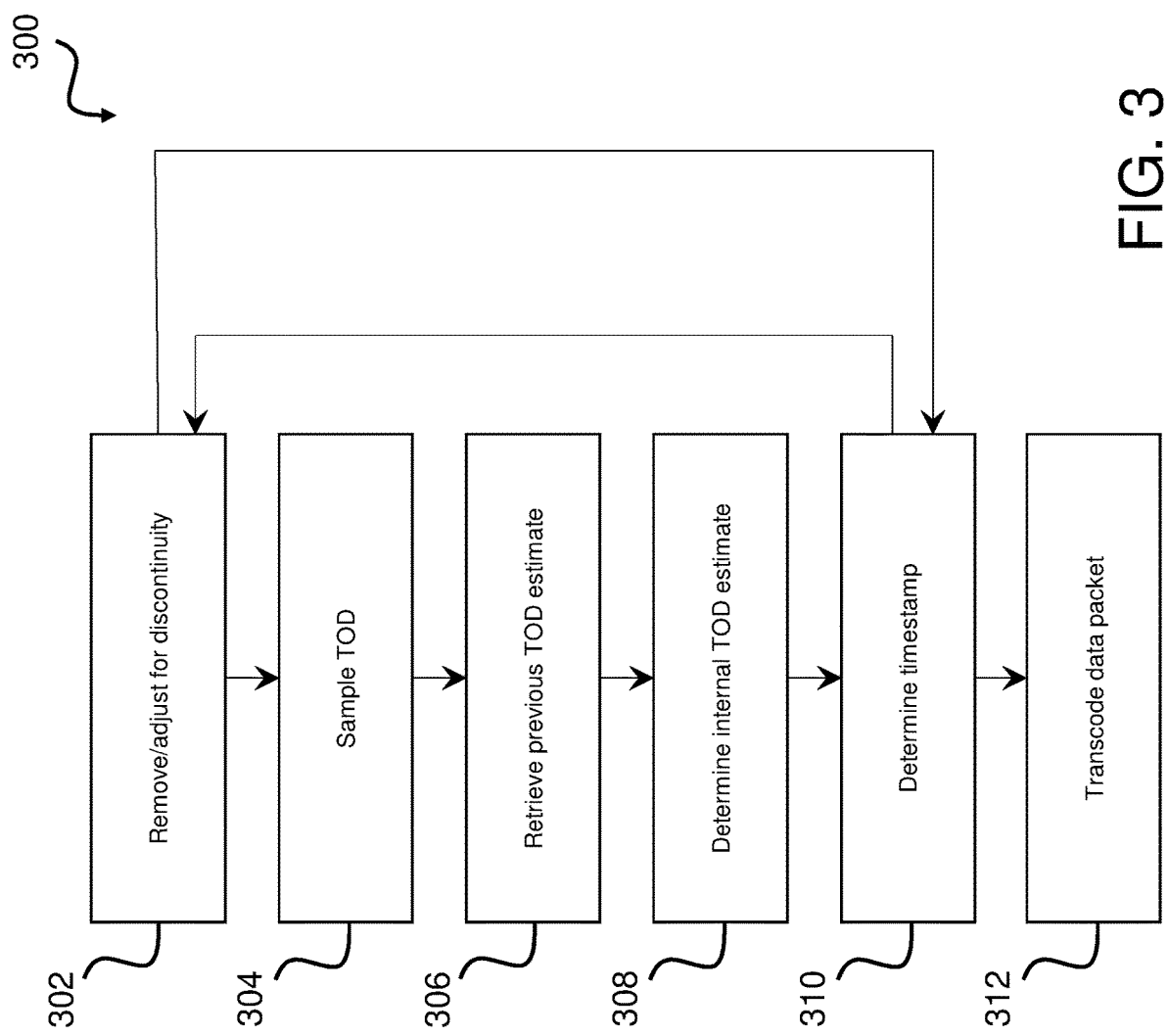
FIG. 3 is a flowchart of a non-limiting embodiment of a process for producing accurate timestamps for transmitted data packets, according to the principles of the presently disclosed subject matter.

Referring now to FIG. 3, FIG. 3 is a flowchart of a non-limiting embodiment of a process 300 for producing accurate timestamps for transmitted data packets. In some non-limiting embodiments, one or more of the steps of process 300 may be performed (e.g., completely, partially, and/or the like) by MII 112 (e.g., timestamping circuitry thereof). In some non-limiting embodiments, one or more of the steps of process 300 may be performed (e.g., completely, partially, and/or the like) by another system, another device, another group of systems, or another group of devices, separate from or including MII 112, such as MAC block 108, PHY 114, PCS 116, PMA 118, PMD 120, and/or MDI 122. In some non-limiting embodiments, timestamping circuitry may be implemented (e.g., completely, partially, and/or the like) by MII 112 and/or MAC block 108.

As shown in FIG. 3, at step 302, process 300 may include removing and/or adjusting for a discontinuity. For example, timestamping circuitry (e.g., of MII 112, MAC block 108, and/or the like) may detect a discontinuous time sample in a TOD input signal. In some non-limiting embodiments, the TOD input signal may be provided (e.g., communicated and/or the like) to the timestamping circuitry from MAC block 108. Additionally or alternatively, the TOD input signal may be provided (e.g., communicated and/or the like) to the timestamping circuitry by host layer(s) 106 (e.g., directly or indirectly via MAC block 108).

In some non-limiting embodiments, the timestamping circuitry (e.g., of MII 112, MAC block 108, and/or the like) may detect the discontinuous time sample in the TOD input signal based on a threshold. For example, the timestamping circuitry may sample the TOD input signal to provide a current time sample. Additionally or alternatively, the timestamping circuitry may compare the current time sample to a previous time sample from the TOD input signal (e.g., the most recent sample from the TOD input signal before the current time sample). In some non-limiting embodiments, if a difference (e.g., subtractive difference, step size, and/or the like) between the current time sample and the previous time sample satisfies a threshold amount (e.g., is greater than a threshold amount, greater than or equal to a threshold amount, and/or the like), then the current time sample may be associated with a discontinuity. In some non-limiting embodiments, the timestamping circuitry may store at least one of the current time sample, the difference between the current time sample and the previous time sample, any combination thereof, and/or the like as the discontinuous time sample.

In some non-limiting embodiments, the threshold may include a predetermined threshold (e.g., a selected threshold, a preselected threshold, a selectable threshold, and/or the like). Additionally or alternatively, the threshold may be dynamic. For example, the timestamping circuitry may store a running log of recent differences (e.g., subtractive differences, step sizes, and/or the like) between consecutive time samples (e.g., current time sample and previous time sample and/or the like). In some non-limiting embodiments, the running log may include a number (e.g., a predetermined number, a selected number, and/or the like) of such differences (e.g., step sizes and/or the like), may include all such differences since an initialization, may include any combination thereof, and/or the like. Additionally or alternatively, the dynamic threshold may be based on the running log. For example, the dynamic threshold may be based on the average of such differences in the running log, the standard deviation of such differences in the running log, any combination thereof, and/or the like. In some non-limiting embodiments, the dynamic threshold may include ten times the average of such differences (e.g., step sizes) and/or the like. Additionally or alternatively, the dynamic threshold may include ten times a predetermined average step size.

In some non-limiting embodiments, the timestamping circuitry may remove the discontinuous time sample from a TOD input signal to provide an estimated TOD signal. For example, the timestamping circuitry may substitute an expected difference for the current time sample to provide the estimated TOD signal. For example, the timestamping circuitry may add the expected difference to the previous time sample to use as the estimated TOD signal. In some non-limiting embodiments, the expected difference may include a predetermined expected difference (e.g., a selected expected difference, a preselected expected difference, a selectable expected difference, and/or the like) and/or the like. Additionally or alternatively, the expected difference may be dynamic. For example, the dynamic expected difference may be based on the average of the running log of differences between consecutive time samples, the standard deviation of the running log of differences, any combination thereof, and/or the like. In some non-limiting embodiments, the dynamic expected difference may be the average of the running log of differences between consecutive time samples.

As shown in FIG. 3, at step 304, process 300 may include sampling a time of day (TOD) signal. For example, the timestamping circuitry (e.g., of MII 112, MAC block 108, and/or the like) may sample a TOD signal to provide a sampled TOD. In some non-limiting embodiments, the timestamping circuitry may sample the TOD input signal (e.g., from MAC block 108, host layer(s) 106, and/or the like) to provide the sampled TOD. Additionally or alternatively, the timestamping circuitry may sample the estimated TOD signal (e.g., with discontinuities removed) to provide the sampled TOD.

In some non-limiting embodiments, the timestamping circuitry (e.g., a sampler thereof and/or the like) may continuously sample the TOD input signal and/or the estimated TOD signal to generate the TOD signal.

In some non-limiting embodiments, a currently sampled TOD estimate may include the sampled TOD. For example, the sampled TOD may be stored and/or used by the timestamping circuitry as the currently sampled TOD estimate.

In some non-limiting embodiments, the timestamping circuitry may sample the TOD signal based on a trigger to provide the sampled TOD. In some non-limiting embodiments, the trigger may include and/or be based on a time at which a data item (e.g., data packet, bit thereof, and/or the like) arrives at MII 112. Additionally or alternatively, sampling the TOD signal may include sampling the TOD signal based on the trigger to provide the currently sampled TOD estimate based on the time at which the data item arrives at MII 112. In some non-limiting embodiments, the trigger may include a time at which a previous data item (e.g., data packet, bit thereof, and/or the like) was output from MII 112 (e.g., to PHY 114 and/or PCS 116 thereof). Additionally or alternatively, sampling the TOD signal may include sampling the TOD signal based on the trigger to provide the currently sampled TOD estimate based on the time at which the previous data item was output from MII 112. In some non-limiting embodiments, the trigger may include and/or be based on a time at which valid data (e.g., a data item, a data packet, a cycle of idles, an idle frame, a message (e.g., control message), non-packet valid data, any other type of data unit, any combination thereof, and/or the like) arrives at MII 112. Additionally or alternatively, sampling the TOD signal may include sampling the TOD signal based on the trigger to provide the currently sampled TOD estimate based on the time at which the valid data arrives at MII 112.

As shown in FIG. 3, at step 306, process 300 may include retrieving a previous TOD estimate. For example, timestamping circuitry (e.g., of MII 112, MAC block 108, and/or the like) may retrieve a previously sampled TOD estimate (e.g., associated with a previous data item and/or the like).

In some non-limiting embodiments, the previously sampled TOD estimate may include an internal TOD estimate (as described herein) associated with a previous data item. Additionally or alternatively, the previously sampled TOD estimate may include a timestamp associated with a previous data item. Additionally or alternatively, the previously sampled TOD estimate may include a sample of the TOD signal based on a previous data item being transmitted via the output port (e.g., based on receiving a side channel signal associated with the previous data item and/or a marker associated therewith being transmitted via the output port, as described herein).

As shown in FIG. 3, at step 308, process 300 may include determining an internal TOD estimate. For example, timestamping circuitry (e.g., of MII 112, MAC block 108, and/or the like) may determine an internal TOD estimate based on the sampled TOD and the previously sampled TOD estimate.

In some non-limiting embodiments, although the TOD signal (and/or the sampled TOD based thereon) may be noisy, the TOD signal may center around a correct (e.g., accurate, precise, and/or the like) value. Additionally or alternatively, determining running calculations (e.g., averaging, iterative estimation, integration, and/or the like) based on the TOD signal may produce an accurate internal TOD estimate, which may be used to produce an accurate estimate of the timestamp, e.g., the time a data item (e.g., data packet, bit thereof, and/or the like) may be output from the output port (e.g., of Ethernet network device 102 and/or PHY 114 thereof).

In some non-limiting embodiments, a currently sampled TOD estimate may include the sampled TOD. For example, the sampled TOD may be stored and/or used by the timestamping circuitry as the currently sampled TOD estimate.

In some non-limiting embodiments, timestamping circuitry may subtract the previously sampled TOD estimate from the currently sampled TOD estimate to provide a difference (e.g., a TOD error signal estimate). Additionally or alternatively, timestamping circuitry may subtract the time a marker associated with a previous data item left the output port (e.g., on the serial interface and/or the like) from the currently sampled TOD estimate to provide a difference.

In some non-limiting embodiments, the timestamping circuitry may multiply the difference (e.g., the TOD error signal estimate, the difference between the currently sampled TOD estimate and the time the marker left the output port, and/or the like) by a weight factor (e.g., a small positive number). For example, the timestamping circuitry may multiply the difference (e.g., TOD error signal estimate) with a weight factor to provide a result (e.g., a first result). In some non-limiting embodiments, the weight factor may include a first number less than one and greater than zero.

In some non-limiting embodiments, the timestamping circuitry may determine a currently estimated slope of the TOD signal based on a previously estimated slope of the TOD signal and the result (e.g., first result). For example, the timestamping circuitry may combine the result (e.g., first result) of the multiplication with the previously estimated slope (e.g., a running estimate of the slope) to provide the currently estimated slope. In some non-limiting embodiments, the currently estimated slope of the TOD signal may include a currently estimated value of a slope of the TOD signal with respect to cycles of MII 112. Additionally or alternatively, the currently estimated slope of the TOD signal may include a currently estimated value of a slope of the TOD signal with respect to data items (e.g., data packets, bits thereof, and/or the like) being transmitted (e.g., from MII 112 to PHY 114, from the output port of PHY 114, and/or the like).

In some non-limiting embodiments, determining the currently estimated slope of the TOD signal may include the timestamping circuitry adding the previously estimated slope of the TOD signal to the result (e.g., first result) to provide the currently estimated slope of the TOD signal. In some non-limiting embodiments, the previously estimated slope of the TOD signal may include a running estimated value of the slope of the TOD signal. Additionally or alternatively, determining the currently estimated slope of the TOD signal may include the timestamping circuitry adding the running estimated value of the slope of the TOD signal to the result (e.g., first result) to provide the currently estimated slope of the TOD signal. Additionally or alternatively, the running estimated value of the slope of the TOD signal may include an average of the slope of the TOD signal (e.g., with respect to cycles of MII 112, with respect to data items being transmitted, and/or the like) over a predetermined time interval.

In some non-limiting embodiments, the timestamping circuitry may multiply the previously estimated slope of the TOD signal with a second weight factor to provide a second result. Additionally or alternatively, determining the currently estimated slope of the TOD signal may include the timestamping circuitry adding the second result to the (first) result to provide the currently estimated slope of the TOD signal. In some non-limiting embodiments, the (first) weight factor may include a first number less than one and greater than zero. Additionally or alternatively, the second weight factor may include the difference between one and the weight factor. In some non-limiting embodiments, the second weight factor may be greater than the (first) weight factor. For example, the (first) weight factor may be 1/512, and the second weight factor may be 511/512.

In some non-limiting embodiments, the timestamping circuitry may add the currently estimated slope of the TOD signal to the previously sampled TOD estimate to provide the internal TOD estimate.

In some non-limiting embodiments, the previously estimated slope of the TOD signal may include (e.g., be replaced with and/or the like) an initialized value of the slope of the TOD signal. For example, the initialized value of the slope may be used at startup, upon receipt of an initialization signal, any combination thereof, and/or the like. Additionally or alternatively, the timestamping circuitry may determine the currently estimated slope of the TOD signal by adding the initialized value of the slope of the TOD signal to the (first) result to provide the currently estimated slope of the TOD signal. In some non-limiting embodiments, using the initialized value of the slope of the TOD signal may speed up convergence of the slope of the TOD signal.

In some non-limiting embodiments, the previously sampled TOD estimate may include (e.g., be replaced with and/or the like) an initialized value of the previously sampled TOD estimate. For example, this initialized value may be used at startup, upon receipt of an initialization signal, any combination thereof, and/or the like. In some non-limiting embodiments, the timestamping circuitry may determine the TOD error signal estimate and/or the internal TOD estimate based on the initialized value of the previously sampled TOD estimate.

In some non-limiting embodiments, the currently estimated slope of the TOD signal may be stored for use in the next cycle (e.g., of MII 112 and/or the like) as the previously estimated slope of the TOD signal. Additionally or alternatively, the internal TOD estimate may be stored for use in the next cycle (e.g., of MII 112 and/or the like) as the previously sampled TOD estimate.

In some non-limiting embodiments, the timestamping circuitry may communicate a marker (e.g., marker bit, alignment marker, and/or the like) associated with a previous data item (e.g., data packet, bit thereof, and/or the like) to an output port. Additionally or alternatively, the timestamping circuitry may count a number of cycles since communicating the marker. In some non-limiting embodiments, the timestamping circuitry may receive a side channel signal (e.g., single bit side channel data and/or the like) associated with the marker being transmitted via the output port. Additionally or alternatively, the timestamping circuitry may sample the TOD signal based on receiving the side channel signal to provide the previously sampled TOD estimate. In some non-limiting embodiments, the timestamping circuitry may store the previously sampled TOD estimate. In some non-limiting embodiments, determining the internal TOD estimate may include the timestamping circuitry multiplying the (counted) number of cycles with an estimated slope of the TOD signal (e.g., with respect to cycles of MII 112) to provide a product. Additionally or alternatively, the timestamping circuitry may add the product to the previously sampled TOD estimate to provide the internal TOD estimate.

In some non-limiting embodiments, the timestamping circuitry may add the currently estimated slope of the TOD signal to the previously sampled TOD estimate to provide the internal TOD estimate.

In some non-limiting embodiments, relationship (e.g., slope and/or the like) between the TOD signal and data items (e.g., slope of the TOD signal with respect to cycles of MII 112 and/or the like) may be referred to as $\widehat{BT}$. In some non-limiting embodiments, to get an accurate estimate of the value of $\widehat{BT}$, the timestamping circuitry may maintain knowledge of the amount of time it takes a bit to leave the output port relative to an MII cycle associated with such bit. In some non-limiting embodiments, the clock of MII 112 and the clock of PHY 114 may be different and/or variable with respect to each other. Additionally or alternatively, the difference and/or variability between the clocks may not be known a priori and/or may not be a fixed value. As such, the timestamping circuitry may measure the time between successive cycles of MII 112 (e.g., the time between consecutive data packets and/or the like). In some non-limiting embodiments, the determination (e.g., generation, calculation, and/or the like) of the estimated slope $\widehat{BT}$ may occur in various places through the datapath, e.g., between the timestamp insertion (e.g., in MAC block 108, MII 112, and/or the like) and SerDes (e.g., in PHY 114, PMA 118, PMD 120, and/or the like).

In some non-limiting embodiments, the measurement of the slope BT (e.g., which may include and/or be based on the time between cycles of MII 112) may be based on maintaining an estimate of the actual time per cycle of MII 112 as seen at the output port. For example, a plot showing an example of TOD samples at MII 112 as a function of cycles of MII 112 is further described below with respect to FIG. 5A. In some non-limiting embodiments, when calculating the estimated TOD (e.g., internal TOD estimate and/or the like) associated with a given data item (e.g., timestamp of a data packet and/or the like), the TOD measured at MII 112 may be taken into account (e.g., by timestamping circuitry, as described herein). Additionally or alternatively, by averaging enough estimates together, an accurate slope BT may be determined, e.g., because the bit rate at the output port may be constant and the clock rate of MII 112 may be constant. In some non-limiting embodiments, this estimate may allow for Ethernet network device 102 (e.g., timestamping circuitry thereof) to automatically compensate for unpredicted differences in the clocks.

In some non-limiting embodiments, the slope $\widehat{BT}$ may be estimated using an averaging filter. For example, at a given cycle i of MII 112, the slope may be referred to as $\widehat{BT}_i$. Additionally or alternatively, to generate an accurate value of $\widehat{BT}_i$ that may accommodate for (e.g., adjust in response to and/or the like) changes in slope, the timestamping circuitry may take into account a previously estimated value of the slope $\widehat{BT}_{i-1}$ and the instantaneous slope $\widetilde{BT}_i$ based on the noisy sampled TOD $\tilde{T}_i$. In some non-limiting embodiments, the internal TOD estimate may be referred to as $\hat{T}_i$. In some non-limiting embodiments, slope $\widetilde{BT}_i$ may be determined based on the following equation:

$$\widetilde{BT}_i = \tilde{T}_i - \tilde{T}_{i-1}$$

Additionally or alternatively, at each cycle of MII 112, the internal TOD estimate $\hat{T}_i$ may be determined based on the following equation:

$$\hat{T}_i = \frac{\hat{T}_i}{512} + \frac{511}{512}(\hat{T}_{i-1} + \widehat{BT}_{i-1})$$

In some non-limiting embodiments, the value of $\hat{T}_i - \hat{T}_{i-1}$ may be returned to the timestamping circuitry as $\widehat{BT}_i$. For example, a plot showing trajectory of these variables is further described below with respect to FIG. 5B.

In some non-limiting embodiments, the value of the internal TOD estimate $\hat{T}_i$ may include an estimate of the TOD with respect to the output at the point where the TOD is being measured. Additionally or alternatively, a previous timestamp $TS_0$ may be used to account for the time it takes to go through the remaining circuitry (e.g., of PHY 114 and/or the like) between the sampling point (e.g., at MII 112 and/or the like) and the output port (e.g., of PHY 114 and/or the like). In some non-limiting embodiments, the bitrate at the output port may be constant. Additionally or alternatively, the slope $\widehat{BT}$ may remain accurate no matter where the TOD is measured in the data path (e.g., from MAC block 108 through PHY 114 and/or the like).

In some non-limiting embodiments, the previously estimated value of the slope $\widehat{BT}_{i-1}$ may include (e.g., be replaced with and/or the like) an initialized value of the slope of the TOD signal, as described herein. For example, the initialized value of the slope may be used at startup, upon receipt of an initialization signal, any combination thereof, and/or the like. In some non-limiting embodiments, using the initialized value of the slope of the TOD signal may speed up convergence of the slope of the TOD signal.

As shown in FIG. 3, at step 310, process 300 may include determining a timestamp. For example, timestamping circuitry (e.g., of MII 112, MAC block 108, and/or the like) may determine a timestamp based on the internal TOD estimate.

In some non-limiting embodiments, the timestamping circuitry may add at least one offset (e.g., based on any delays between the parallel and serial interfaces) to the internal TOD estimate. For example, determining the timestamp may include adding a predetermined time offset (e.g., a selected time offset, a preselected time offset, a selectable time offset, and/or the like) and/or the like to the internal TOD estimate to provide a sum. Additionally or alternatively, the timestamp may be determined based on the sum (e.g., be equal to the sum and/or the like). In some non-limiting embodiments, the predetermined time offset may be based on an amount of time for a bit to travel from a parallel interface to a serial interface. Additionally or alternatively, the parallel interface may include MII 112 and/or the serial interface may include the output port of PHY 114.

In some non-limiting embodiments, the timestamping circuitry may adjust for a discontinuity. For example, if a discontinuity (e.g., discontinuous time sample and/or the like) was detected at step 302, the timestamping circuitry may determine the timestamp based on the discontinuous time sample and the internal TOD estimate. In some non-limiting embodiments, the timestamping circuitry may replace the discontinuous time sample in the internal TOD estimate (and/or the sum of adding the predetermined time offset to the internal TOD estimate) to provide the timestamp. For example, if the difference between the current time sample and the previous time sample were stored as the discontinuous time sample, as described herein, replacing the discontinuous time sample may include adding the discontinuous time sample to the internal TOD estimate (and/or the sum of adding the predetermined time offset to the internal TOD estimate) to provide the timestamp.

In some non-limiting embodiments, the estimate of the timestamp may be based on the amount of time between data items on the output of Ethernet network device 102, the time it takes for a data time to propagate from the parallel interface to the output port (e.g., of Ethernet network device 102 and/or PHY 114 thereof), any combination thereof, and/or the like.

In some non-limiting embodiments, timestamping circuitry may estimate the amount of time between data items (e.g., data packets, bits thereof, and/or the like) at the output port (e.g., of Ethernet network device 102 and/or PHY 114 thereof) based on measuring the error between the sampled TOD (e.g., currently sampled TOD estimate) at MII 112, the previous TOD estimate, any combination thereof, and/or the like.

In some non-limiting embodiments, the timestamping circuitry may estimate the time it takes for a data item (e.g., data packet, bits thereof, and/or the like) to propagate between MII 112 (e.g., a parallel interface) and the output port (e.g., serial interface) using one or more of multiple techniques. For example, a marker (e.g., marker bit, alignment marker, any combination thereof, and/or the like) may be communicated from MII 112 to the output port, and timestamping circuitry may sample the TOD signal based on the marker being transmitted via the output port. The timestamping circuitry may estimate the time it takes for the marker (e.g., associated with a data item) to propagate between MII 112 and the output port based on this sample. Additionally or alternatively, the timestamping circuitry may add an integral term to a filter estimating the time between data items. Given enough time, such an integral term may provide an estimate for the amount of time it takes a data item to propagate through the pipeline (e.g., between MII 112 and the output port).

In some non-limiting embodiments, given a good estimate of the time between data items and the time it takes a data item to propagate from MII 112 (e.g., parallel interface) to the output port (e.g., serial interface), a timestamp for any given bit is then generated by taking the current estimated time for a bit and adding to it the internal estimate of the time between bits and the amount of time it takes to get from the parallel to serial interface.

In some non-limiting embodiments, the data rate through a channel (e.g., from MAC block 108 through the output port of PHY 114 and/or the like) may be stable (e.g., constant and/or the like). Additionally or alternatively, the data transformations performed by PHY 114 in the process of FEC transcoding may not significantly modify the bit order of data as it appears when viewed at MII 112. As such, since the bit order may be assumed to not change and the bit rate of the output of PHY 114 may be assumed to be constant, an accurate timestamp in the transmit mode may be determined based on a previous timestamp $TS_0$ (e.g., most recent known good timestamp value as measured at the output of PHY 114), the relationship (e.g., slope $\widehat{BT}$) between cycles of MII 112 and TOD, the number N of cycles of MII 112 since the previous timestamp $TS_0$, any combination thereof, and/or the like. For example, given the previous timestamp $TS_0$, the relationship (e.g., slope $\widehat{BT}$) between MII cycles and TOD, and the count N of MII cycles since that previous timestamp $TS_0$, the timestamp $\overline{TS}$ for time N may be estimated based on the following equation:

$$\overline{TS} = TS_0 + N \cdot \overline{BT}$$

In some non-limiting embodiments, given the variable latency of PHY 114, it may be possible to accurately measure a timestamp at the moment the timestamp leaves PHY 114. Additionally or alternatively, this point in time (e.g., leaving PHY 114) may be too late for generating the timestamp itself. However, in some non-limiting embodiments, this measurement may be used to generate an accurate previous timestamp $TS_0$. In some non-limiting embodiments, to accurately identify the time a particular data item (e.g., data packet, a bit thereof, and/or the like) leaves PHY 114 may include using a marker bit is_ts (e.g., a bit of side channel information and/or the like). For example, when the marker bit is_ts arrives at the output of PHY 114, a signal (e.g., a first side channel signal, which may include an ACK signal, the marker bit is_ts as a feedback signal, and/or the like) may be sent to circuitry (e.g., of the timestamping circuitry), which may sample the TOD (e.g., to use as previous timestamp $TS_0$). In some non-limiting embodiments, this previous timestamp $TS_0$ may be passed back to the timestamping circuitry (e.g., of MAC 108, MII 112, and/or the like) for use in generating timestamps. In some non-limiting embodiment, the marker bit is_ts may be generated by timestamping circuitry (e.g., MII 112, MAC block 108, and/or the like) so that the timestamping circuitry may count the number N of clock cycles (e.g., of MII 112 and/or the like) between when the marker bit is_ts is sent and the current time (e.g., currently sampled TOD). In some non-limiting embodiments, the TOD input signal $TOD_i$ may come from an external source (e.g., host layer(s) 106, MAC block 108, and/or the like). Additionally or alternatively, the a sampled TOD ($TOD_{sampled}$) when the signal (e.g., ACK signal, is_ts feedback signal, and/or the like) is received may indicate to the timestamping circuitry the most recent value of $TS_0$, and/or a side channel signal (e.g., "Done") may indicate that the previous timestamp $TS_0$ has been captured.

In some non-limiting embodiments, the timestamping circuitry may communicate the marker (e.g., is_ts) associated with the previous data item to the output port (e.g., of PHY 114). Additionally or alternatively, the timestamping circuitry may count the number N of cycles since communicating the marker (e.g., is_ts). In some non-limiting embodiments, the timestamping circuitry may receive a side channel signal associated with the marker (e.g., ACK signal, is_ts feedback signal, and/or the like) being transmitted via the output port. Additionally or alternatively, the timestamping circuitry may sample the TOD signal based on receiving the side channel signal to provide the previous timestamp $TS_0$. Additionally or alternatively, the timestamping circuitry may store the previously sampled TOD estimate.

In some non-limiting embodiments, there may be multiple timestamp points in a single cycle of MII 112 (e.g., associated with data items that may leave PHY 114 at slightly different times). Additionally or alternatively, the values of the number of cycles N and the slope $\overline{BT}$ may be adjusted to account for these multiple timestamp points. For example, the number of timestamp positions $N_{pos}$ that have entered PHY 114 may be counted. Additionally or alternatively, the slope $\overline{BT}$ may be calculated per cycle of MII 112 (e.g., as described above) and/or may be divided by the number of potential timestamp positions $M_{pos}$ within a single cycle of MII 112. As such, the timestamp $\overline{TS}_N$ may be estimated based on the following equation $$\overline{TS}_N = TS_0 + N_{pos} \cdot \frac{\overline{BT}}{M_{pos}}$$

In some non-limiting embodiments, the aforementioned equations may be applied in both the reception direction and the transmission direction, as described herein.

In some non-limiting embodiments, various system clocks may drift relative to one another. Additionally or alternatively, over time, the relationship between the clock of MII 112 and TOD may change. In some non-limiting embodiments, techniques for determining the slope of the TOD signal, as described herein, may be robust to such changes. For example, a shifting clock speed may not affect the latency seen by the data items (e.g., bits and/or the like), which may be captured by $TS_0$, and the slope may be continuously updated in consecutive cycles, as described herein. In some non-limiting embodiments, if there is an abrupt clock frequency change, there may be a period of adjustment where timestamps are slightly less accurate. Additionally or alternatively, a gradual clock frequency change may naturally be filtered by the techniques described herein, e.g., based on the assumption that the response rate of the timestamping circuitry (e.g., slope determination functionality thereof) may be faster than the clock change. In some non-limiting embodiments, the timestamping circuitry (e.g., slope determination functionality thereof) may be adjusted based on the particular dynamics of the clocks in Ethernet network device 102, the requirements thereof, and/or the requirements of communication network 104 associated therewith.

In some non-limiting embodiments, e.g., as part of the IEEE 1588 PTP, the TOD input signal $TOD_i$ to the system may periodically jump as Ethernet network device 102 synchronizes its time (e.g., its clocks and/or the like) with other members (e.g., other Ethernet network devices 102 and/or the like) of network 104. Additionally or alternatively, a jump in the TOD may cause two disturbances that may lead to a period of inaccurate timestamps: (1) the value of $TS_0$ may no longer be applicable to the current cycle, as the jump should change TOD with respect to all previous timestamps and/or sampled TODs, and (2) the slope $\overline{BT}$ may be perturbed from equilibrium due to the large jump in TOD. In some non-limiting embodiments, given enough time (e.g., enough cycles of MII 112 and/or the like), both of these errors may be compensated for, e.g., by the arrival of the next $TOD_{sampled}$ and Done signals, by the natural evolution of the filtered estimate of the slope $\overline{BT}$ over time, any combination thereof, and/or the like.

In some non-limiting embodiments, the TOD may jump an arbitrary amount (e.g., due to synchronization and/or the like). Additionally or alternatively, it may be preferable to add additional inputs alongside the TOD input signal $TOD_i$ to compensate for the jump. For example, a first signal may indicate a jump in the TOD on the next cycle (e.g., of MII 112 and/or the like) and/or a second signal may indicate the magnitude and direction of that jump ($\Delta TOD_i$). In some non-limiting embodiments, the magnitude and direction of the jump $\Delta TOD_i$ may be added to $TS_0$ for at least one future (e.g., current) timestamp calculation. Although the timestamps still in the pipeline (e.g., past the timestamping point) may still be inaccurate, that inaccuracy may be inevitable, but the next timestamp may be accurate. Additionally or alternatively, the magnitude and direction of the jump $\Delta TOD_i$ may be added to the stored value of the previously sampled TOD estimate $\hat{T}_{i-1}$. For example, since the slope of the TOD signal may not change at a jump discontinuity, changing that value for the previously sampled TOD estimate $\hat{T}_{i-1}$ in the calculation of the slope $\widehat{BT}_i$ may prevent disturbing the estimate of the slope.

In some non-limiting embodiments, clause 90 of the IEEE standard 802.3 indicates that any skew caused by virtual lanes may be considered delay in transmission medium 124. In some non-limiting embodiments, to address this, the timestamping circuitry may assign any bits in each virtual lane a timestamp equal to the timestamp that would be applied to the fastest lane. For example, this may be done by tying the is_ts signal to the time of the fastest lane exiting PHY 114 (e.g., exiting PMA 118, PMD 120, and/or the like).

In some non-limiting embodiments, IEEE 1588 PTP may not consider the effect of alignment markers on the generation of accurate timestamps. Additionally or alternatively, alignment markers may be used in high speed configurations to realign virtual lanes in PHY 114. In some non-limiting embodiments, alignment marker insertion and removal may change the position of the data in the data stream relative to idle cycles. Additionally or alternatively, if the alignment marker insertion and removal is not taken into account consistently, this may cause error in the timestamp perceived by each member (e.g., Ethernet network device 102). In some non-limiting embodiments, the timestamping circuitry may insert the alignment markers before the timestamp is added in the transmission direction, and/or the timestamping circuitry may calculate the timestamp in the reception direction before the alignment markers are removed. Additionally or alternatively, this may ensure that the members (e.g., Ethernet network devices 102) see consistent timestamps, regardless of data being moved by the alignment marker manipulation.

As shown in FIG. 3, at step 312, process 300 may include transcoding a data item (e.g., data packet), which may include a timestamp. For example, PHY 114 (e.g., PCS 116, PMA 118, and/or the like of PHY 114) may transcode the timestamp into the data packet prior to transmitting the data packet via the output port. Additionally or alternatively, the timestamping circuitry (e.g., of MII 112, MAC block 108, and/or the like) may append the timestamp to the data packet as it leaves the parallel interface of MII 112, and PHY 114 may transcode the data packet (including the timestamp).

Figure 4A:
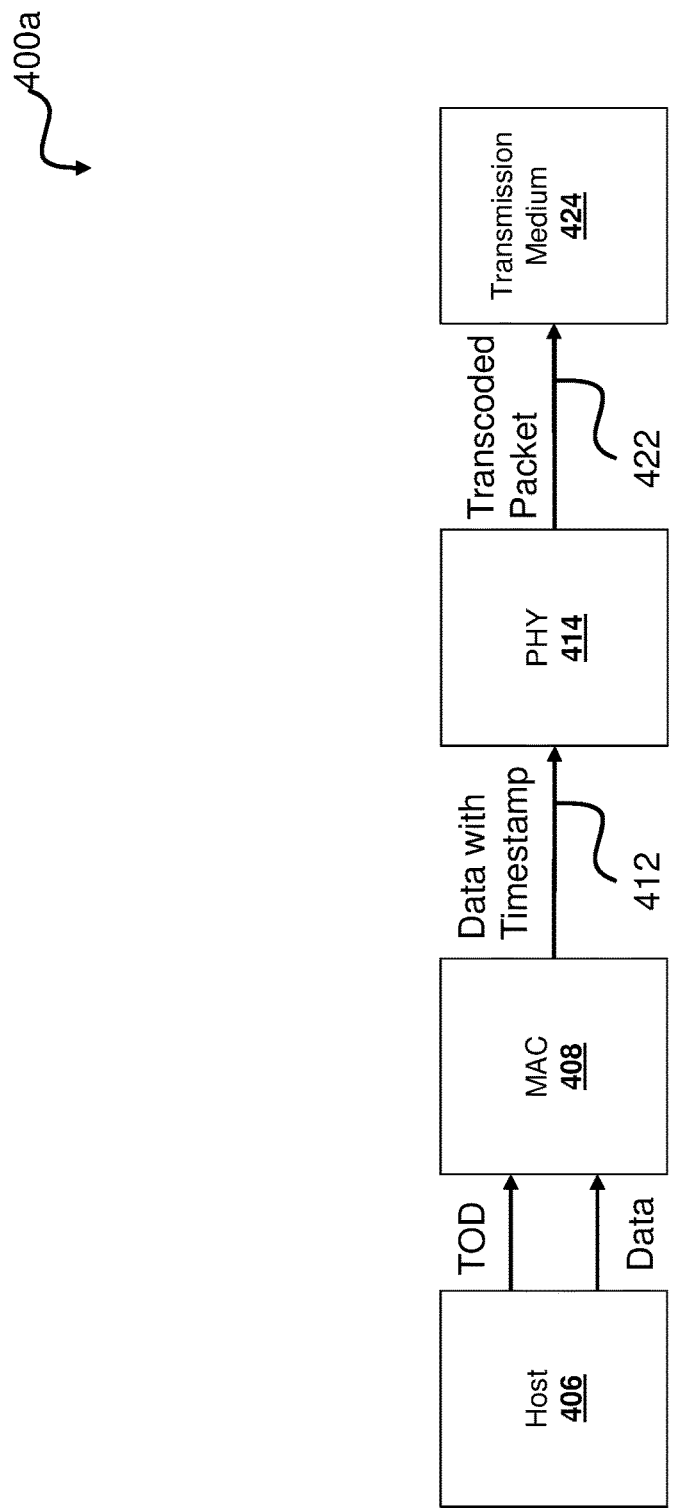
FIGS. 4A-4C are diagrams of non-limiting embodiments of implementations of non-limiting embodiments of the process shown in FIG. 3, according to the principles of the presently disclosed subject matter.

Referring now to FIG. 4A, FIG. 4A is a diagram of an exemplary implementation 400a of a non-limiting embodiment relating to process 300 shown in FIG. 3. As shown in FIG. 4A, implementation 400a may include host layer(s) 406, MAC block 408, MII 412, PHY 414, MDI 422, and/or transmission medium 424. In some non-limiting embodiments, host layer(s) 406 may be the same as or similar to host layer(s) 106. In some non-limiting embodiments, MAC block 408 may be the same as or similar to MAC block 108. In some non-limiting embodiments, MII 412 may be the same as or similar to MII 112. In some non-limiting embodiments, PHY 414 may be the same as or similar to PHY 114. In some non-limiting embodiments, MDI 422 may be the same as or similar to MDI 122. In some non-limiting embodiments, transmission medium 424 may be the same as or similar to transmission medium 124. In some non-limiting embodiments or aspects, timestamping circuitry may include and/or be included in (e.g., be a part of, be implemented by, and/or the like) MAC block 408, MII 412, any combination thereof, and/or the like.

In some non-limiting embodiments or aspects, host layer(s) 406 may communicate data items (e.g., to MAC block 408 and/or the like), as described herein. Additionally or alternatively, host layer(s) 406 may communicate a TOD input signal (e.g., to MAC block 408 and/or the like), as described herein.

In some non-limiting embodiments, the timestamping circuitry (e.g., of MII 412, MAC block 408, and/or the like) may remove and/or adjust for discontinuities in the TOD input signal to provide a TOD signal (e.g., an estimated TOD signal and/or the like), as described herein. Additionally or alternatively, the timestamping circuitry may sample the TOD signal (e.g., the TOD input signal, the estimated TOD signal with discontinuities removed, and/or the like), as described herein.

In some non-limiting embodiments or aspects, the timestamping circuitry (e.g., of MII 412, MAC block 408, and/or the like) may determine an internal TOD estimate, as described herein. For example, the timestamping circuitry may retrieve a previously sampled TOD estimate, a previously estimated slope of the TOD signal, and/or the like, as described herein. Additionally or alternatively, the timestamping circuitry may determine the currently estimated slope of the TOD signal (e.g., with respect to cycles of the MII 412) based on the previously sampled TOD estimate, the currently sampled TOD estimate, at least one weight factor, the previously estimated slope of the TOD signal, and/or the like, as described herein. Additionally or alternatively, the timestamping circuitry may determine the internal TOD estimate based on the currently estimated slope of the TOD signal, the previously sampled TOD estimate, and/or the like, as described herein.

In some non-limiting embodiments or aspects, the timestamping circuitry (e.g., of MII 412, MAC block 408, and/or the like) may determine the timestamp based on the internal TOD estimate, as described herein. For example, the timestamping circuitry may determine the timestamp based on at least one of a predetermined offset, a discontinuous time sample, the internal TOD estimate, any combination thereof, and/or the like, as described herein.

In some non-limiting embodiments or aspects, PHY 414 may transcode a data packet including the timestamp, as described herein. Additionally or alternatively, the transcoded data packet (including the timestamp) may be communicated from the output port of PHY 414 (e.g., from MDI 422 and/or the like) onto transmission medium 424, as described herein.

Figure 4B:
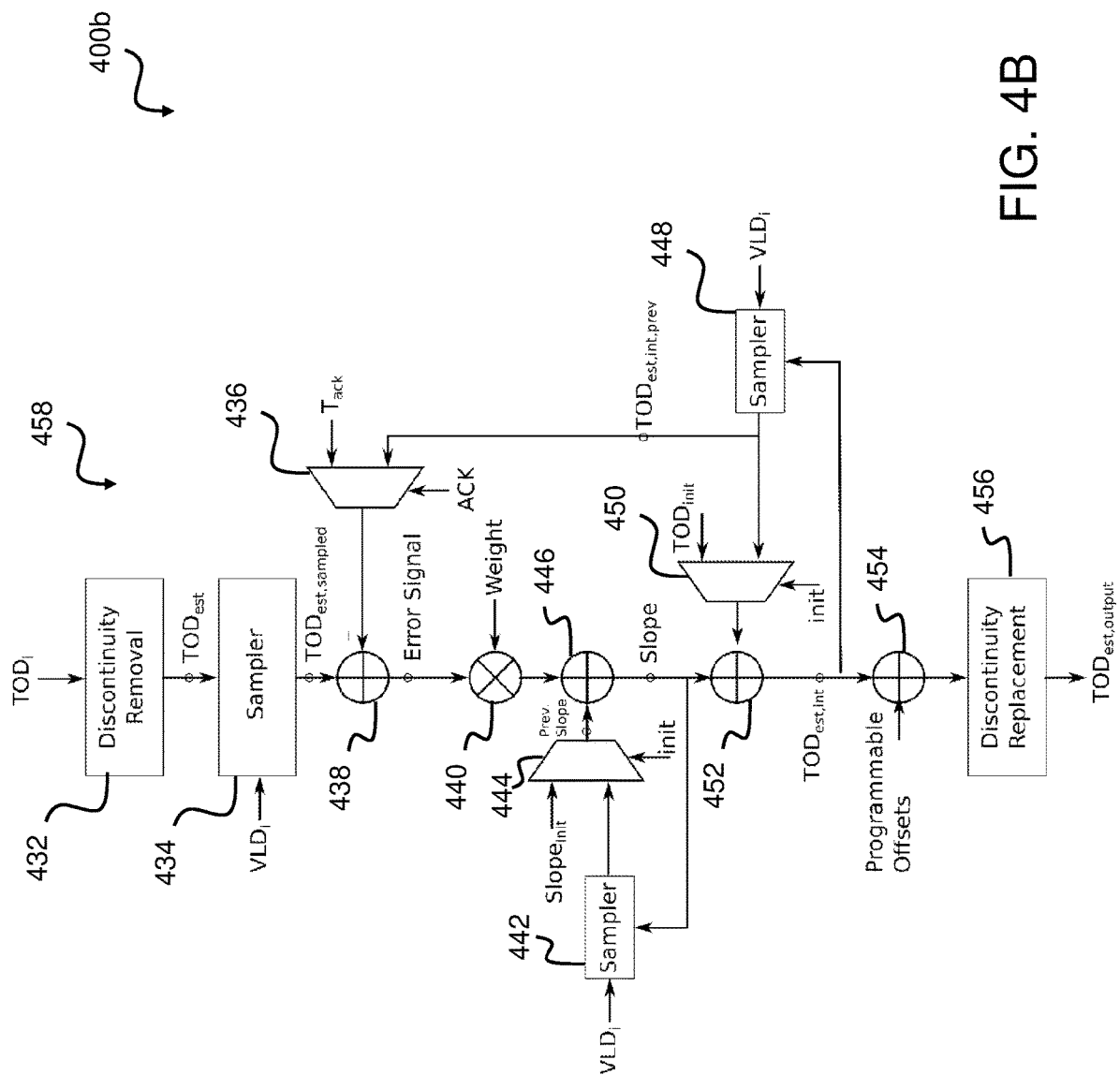

Referring now to FIG. 4B, FIG. 4B is a diagram of an exemplary implementation 400b of a non-limiting embodiment relating to process 300 shown in FIG. 3. As shown in FIG. 4B, implementation 400b may include timestamping circuitry 458, which may include discontinuity removal circuitry 432, first sampler 434, first multiplexer 436, first adder 438, multiplier 440, second sampler 442, second multiplexer 444, second adder 446, third sampler 448, third multiplexer 450, third adder 452, fourth adder 454, and/or discontinuity replacement circuitry 456. In some non-limiting embodiments or aspects, timestamping circuitry 458 may be the same as and/or part of (e.g., implemented by and/or the like) MAC block 108, MII 112, any combination thereof, and/or the like.

In some non-limiting embodiments, a TOD input signal $TOD_i$ may be communicated to discontinuity removal circuitry 432. Additionally or alternatively, discontinuity removal circuitry 432 may remove a discontinuous time sample from the TOD input signal $TOD_i$ to provide an estimated TOD signal $TOD_{est}$, as described herein.

In some non-limiting embodiments, first sampler 434 may sample the estimated TOD signal $TOD_{est}$ to provide a sampled TOD $TOD_{est,sampled}$, as described herein. For example, first sampler 434 may sample the estimated TOD signal $TOD_{est}$ based on a trigger $VLD_i$, as described herein. In some non-limiting embodiments, the trigger may include and/or be based on a time at which valid data (e.g., a data item, a data packet, a cycle of idles, an idle frame, a message (e.g., control message), non-packet valid data, any other type of data unit, any combination thereof, and/or the like) arrives at MII 112, as described herein. Additionally or alternatively, the trigger may include a time at which a previous data packet was output from MII 112, as described herein.

In some non-limiting embodiments, first multiplexer 436 may provide (e.g., retrieve, communicate, and/or the like) a previously sampled TOD estimate, as described herein. For example, in the absence of a side channel signal ACK, the previously sampled TOD estimate may include the internal TOD estimate associated with a previous data item $TOD_{est,int,prev}$, as described herein. Additionally or alternatively, upon receipt of the side channel signal ACK, the previously sampled TOD estimate may include a measured TOD value $T_{ack}$ associated with a previous data item, as described herein. For example, the side channel signal ACK may indicate that the previous data item (e.g., the most recently tracked bit) has left the output port of PHY 114 and the measured TOD value $T_{ack}$ may be the TOD at which that leaving from the output port occurred.

In some non-limiting embodiments, first adder 438 may determine a TOD error signal based on the sampled TOD $TOD_{est,sampled}$ and the previously sampled TOD estimate, as described herein. For example, the value of the previously sampled TOD estimate may be converted to a negative value, and the negative value may be added to the sampled TOD $TOD_{est,sampled}$ (e.g., addition of the negative value may be mathematically equivalent to subtracting the previously sampled TOD estimate) to provide the TOD error signal.

In some non-limiting embodiments, multiplier 440 may multiply the TOD error signal with a weight factor to provide a (first) result, as described herein.

In some non-limiting embodiments, second sampler 442 may sample a running estimated value of the slope of the TOD signal (e.g., associated with a previous cycle, data item, and/or the like). For example, second sampler 442 may sample the estimated TOD signal $TOD_{est}$ based on trigger $VLD_i$, as described herein. In some non-limiting embodiments, second sampler 442 may sample the running estimated value of the slope of the TOD signal based on a trigger $VLD_i$, as described herein.

In some non-limiting embodiments, second multiplexer 444 may provide (e.g., retrieve, communicate, and/or the like) a previously estimated slope of the TOD signal, as described herein. For example, in the absence of an initialization signal, the previously estimated slope of the TOD signal from second multiplexer 444 may include the running estimated value of the slope of the TOD signal from second sampler 442, as described herein. Additionally or alternatively, upon receipt of the initialization signal, the previously estimated slope of the TOD signal from second multiplexer 444 may include an initialized value of the slope of the TOD signal, as described herein. In some non-limiting embodiments, a second multiplier (not pictured) may multiply the previously estimated slope of the TOD signal from second multiplexer 444 with a second weight factor to provide a second result, as described herein.

In some non-limiting embodiments, second adder 446 may determine a currently estimated slope of the TOD signal based on a previously estimated slope of the TOD signal and the (first) result (of the multiplication of the TOD error signal with the weight factor), as described herein. For example, second adder 446 may add the previously estimated slope of the TOD signal to the (first) result to provide the currently estimated slope of the TOD signal. Additionally or alternatively, second adder 446 may add the second result to the first result to provide the currently estimated slope of the TOD signal, as described herein.

In some non-limiting embodiments, third sampler 448 may sample internal TOD estimates $TOD_{est,int}$, e.g., for use as previously sampled TOD estimates in subsequent cycles. For example, for the current cycle, third sampler 448 may provide the internal TOD estimate associated with a previous data item as the previously sampled TOD estimate to first multiplexer 436, third multiplexer 450, and/or the like. In some non-limiting embodiments, third sampler 448 may sample the internal TOD estimates $TOD_{est,int}$ based on a trigger $VLD_i$, as described herein.

In some non-limiting embodiments, third multiplexer 450 may provide (e.g., retrieve, communicate, and/or the like) the previously sampled TOD estimate, as described herein. For example, in the absence of an initialization signal, the previously sampled TOD estimate may include the internal TOD estimate associated with a previous data item $TOD_{est,int,prev}$, e.g., as sampled by third sampler 448, as described herein. Additionally or alternatively, upon receipt of the initialization signal, the previously sampled TOD estimate may include an initialized value of the previously sampled TOD estimate, as described herein.

In some non-limiting embodiments, third adder 452 may determine the internal TOD estimate $TOD_{est,int}$ based on the currently estimated slope of the TOD signal and the previously sampled TOD estimate. For example, third adder 452 may add the currently estimated slope of the TOD signal to the previously sampled TOD estimate to provide the internal TOD estimate.

In some non-limiting embodiments, fourth adder 454 may the internal TOD estimate to a predetermined time offset to provide a sum, as described herein.

Additionally or alternatively, if discontinuity removal circuitry 432 removed a discontinuous time sample, discontinuity replacement circuitry 456 may replace the discontinuous time sample in the sum, a described herein. Additionally or alternatively, the output of the discontinuity replacement circuitry 456 may include the timestamp $TOD_{est,output}$, as described herein.

Figure 4C:
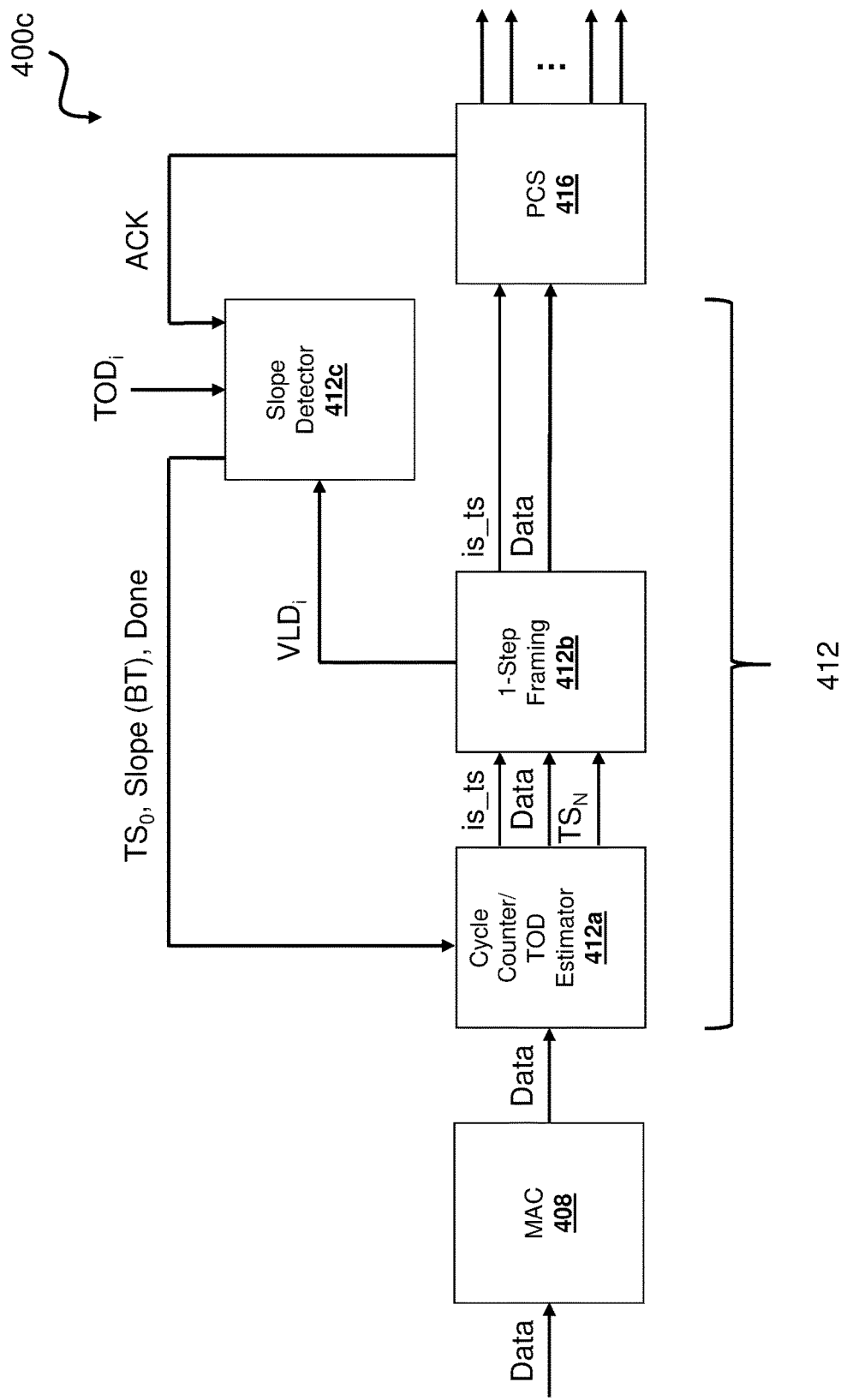

Referring now to FIG. 4C, FIG. 4C is a diagram of an exemplary implementation 400c of a non-limiting embodiment relating to process 300 shown in FIG. 3. As shown in FIG. 4C, implementation 400c may include MAC block 408, MII 412, and/or PCS 416. In some non-limiting embodiments, MAC block 408 may be the same as or similar to MAC block 108. In some non-limiting embodiments, MII 412 may be the same as or similar to MII 112. In some non-limiting embodiments, PCS 416 may be the same as or similar to PCS 116. In some non-limiting embodiments or aspects, timestamping circuitry may include and/or be included in (e.g., be a part of, be implemented by, and/or the like) MAC block 408, MII 412, any combination thereof, and/or the like. Additionally or alternatively, timestamping circuitry may include cycle counter/TOD estimator 412a, 1-step framing circuitry 412b, slope detector 412c, any combination thereof, and/or the like.

In some non-limiting embodiments, MAC block 408 may receive data items (e.g., from host layer(s) 106 and/or the like), as described herein. Additionally or alternatively, MAC block 408 may communicate the data items (e.g., to MII 412, timestamping circuitry, and/or the like), as described herein. For example, MAC block 408 may communicate the data items to cycle counter/TOD estimator 412a.

In some non-limiting embodiments, cycle counter/TOD estimator 412a may receive the data items (e.g., from MAC block 408 and/or the like). Additionally or alternatively, cycle counter/TOD estimator 412a may receive (e.g., from slope detector 412c and/or the like) a previous timestamp $TS_0$ (e.g., most recent known good timestamp value as measured at slope detector 412c based on a side channel signal from PCS 416 and/or the like), the slope $\overline{BT}$ between TOD and cycles of MII 412, and/or at least one side channel signal (e.g., "Done"), as described herein. In some non-limiting embodiments, cycle counter/TOD estimator 412a may count number of cycles N (e.g., of MII 412) since previous data items associated with the previous timestamp $TS_0$ were communicated from cycle counter/TOD estimator 412a, as described herein. Additionally or alternatively, cycle counter/TOD estimator 412a may determine (e.g., estimate, calculate, and/or the like) a current timestamp $\overline{TS}_N$ for the current data items based on the previous timestamp $TS_0$, the slope $\overline{BT}$, and the number of cycles N, as described herein. In some non-limiting embodiments, cycle counter/TOD estimator 412a may count a number of timestamp positions $N_{pos}$ that have entered PCS 416 (e.g., since previous data items associated with the previous timestamp $TS_0$ were communicated and/or the like), as described herein. Additionally or alternatively, cycle counter/TOD estimator 412a may determine (e.g., estimate, calculate, and/or the like) a current timestamp $\overline{TS}_N$ for the current data items based on the previous timestamp $TS_0$, the slope $\overline{BT}$, the number of timestamp positions $N_{pos}$ that have entered PCS 416, and a number of potential timestamp positions $M_{pos}$, as described herein.

In some non-limiting embodiments, cycle counter/TOD estimator 412a communicate the data items, the current timestamp $\overline{TS}_N$, and a marker bit is_ts (e.g., a bit of side channel information and/or the like) to 1-step framing circuitry 412b, as described herein. Additionally or alternatively, 1-step framing circuitry 412b may receive the data items, the current timestamp $\overline{TS}_N$, and the marker bit is_ts. In some non-limiting embodiments, 1-step framing circuitry 412b may append the current timestamp $\overline{TS}_N$ to the data items, as described herein. Additionally or alternatively, 1-step framing circuitry 412b may communicate the marker bit is_ts and the data items (with the current timestamp $\overline{TS}_N$ appended thereto) to PCS 416. In some non-limiting embodiments, 1-step framing circuitry 412b may communicate a trigger $VLD_i$, as described herein. In some non-limiting embodiments, the trigger $VLD_i$ may indicate and/or be based on a time at which the data items (e.g., valid data and/or the like) arrives at MII 412, as described herein.

In some non-limiting embodiments, slope detector 412c may receive, from PCS 416, a side channel signal ACK, and the reception of the side channel signal ACK from PCS 416 may indicate that the marker bit is_ts has arrived at the output port of a PHY (e.g., PHY 114 and/or the like). Additionally or alternatively, slope detector 412c may sample a TOD input signal ($TOD_i$) based on receiving the side channel signal ACK (e.g., from PCS 416) to provide a noisy sampled TOD $\hat{T}_i$, as described herein. In some non-limiting embodiments, slope detector 412c may receive, from 1-step framing circuitry 412b, the trigger $VLD_i$, as described herein. Additionally or alternatively, the trigger $VLD_i$ may indicate and/or be based on a time at which the data items (e.g., valid data and/or the like) arrives at MII 412, as described herein. Additionally or alternatively, slope detector 412c may sample a TOD input signal ($TOD_i$) based on receiving the trigger $VLD_i$ (e.g., from 1-step framing circuitry 412b) to provide the noisy sampled TOD $\hat{T}_i$, as described herein. In some non-limiting embodiments, slope detector 412c may determine (e.g., estimate, calculate, and/or the like) the internal TOD estimate $\hat{T}_i$ and/or the slope $\overline{BT}_i$, as described herein. Additionally or alternatively, slope detector 412c may communicate the internal TOD estimate $\hat{T}_i$ to cycle counter/TOD estimator 412a as the previous timestamp $TS_0$ for the next data items, as described herein. Additionally or alternatively, slope detector 412c may communicate the slope $\overline{BT}_i$ as the slope $\overline{BT}$ to cycle counter/TOD estimator 412a as for the next data items, as described herein. Additionally or alternatively, slope detector 412c may communicate at least one side channel signal (e.g., "Done") to cycle counter/TOD estimator 412a, as described herein.

Figure 5A:
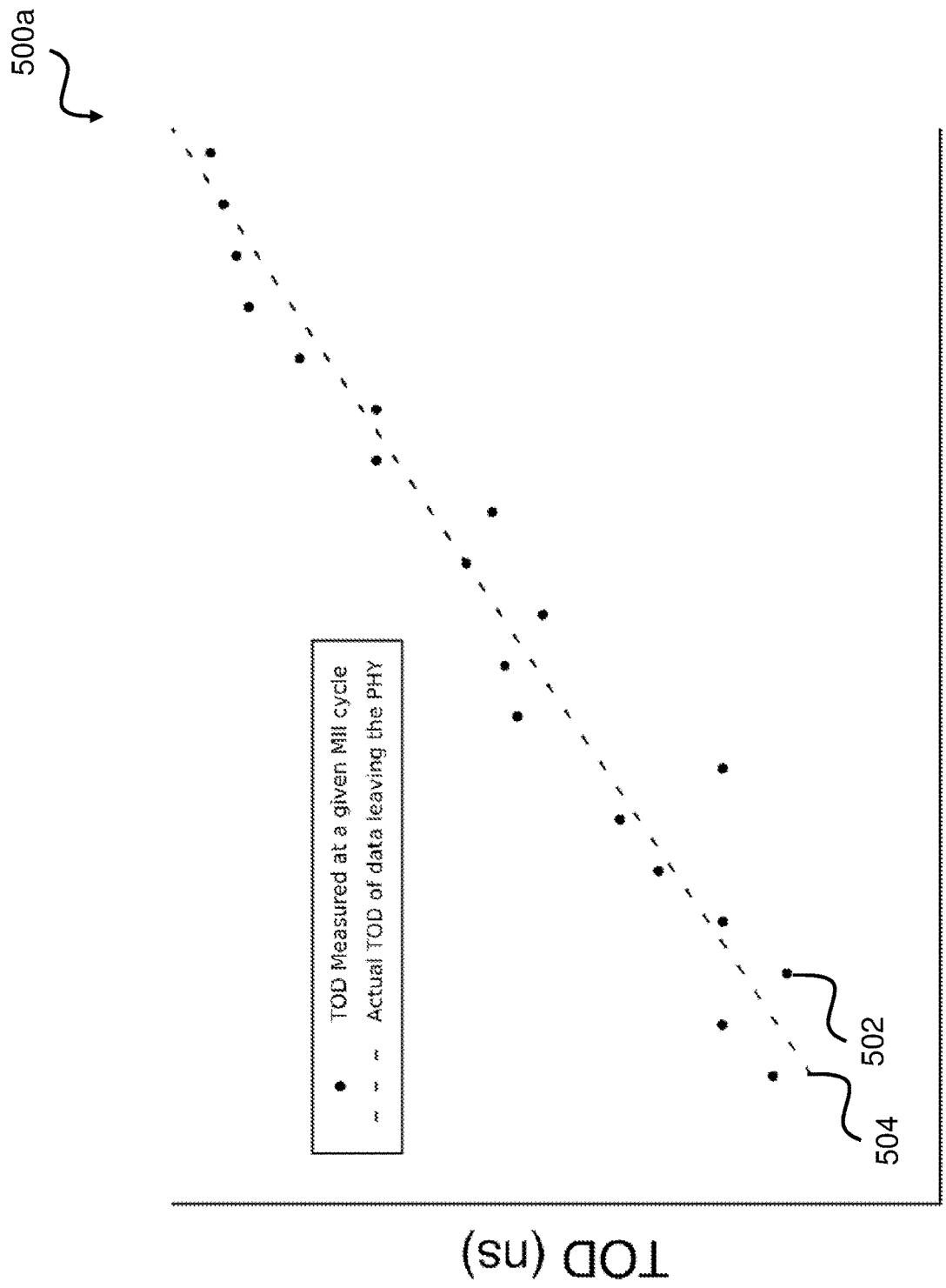
FIGS. 5A and 5B are plots of time of day (TOD) against media independent interface (MII) cycles of non-limiting embodiments of the process shown in FIG. 3, according to the principles of the presently disclosed subject matter.
Figure 5B:
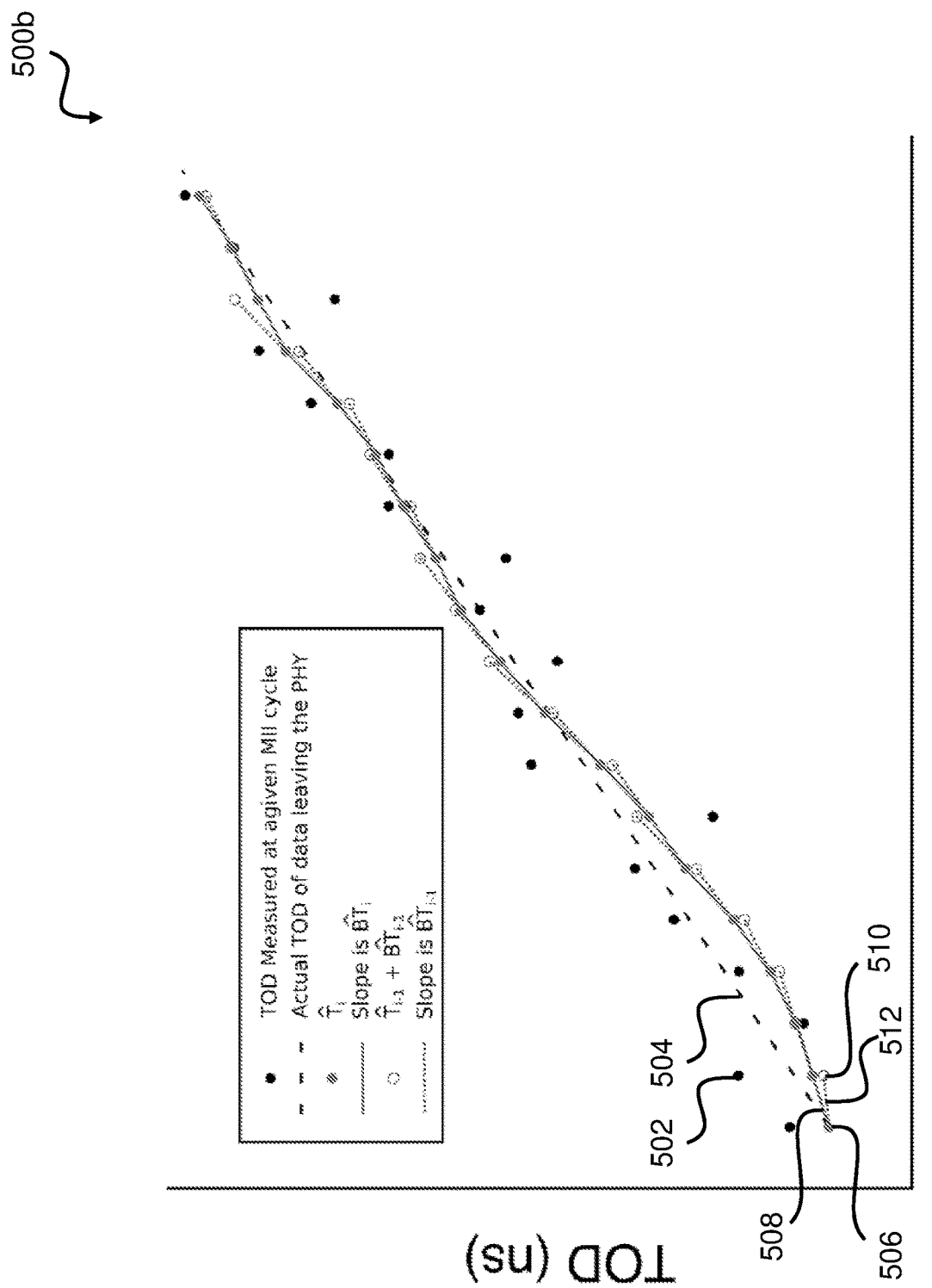

Referring now to FIGS. 5A and 5B, FIGS. 5A and 5B are plots of time of day (TOD) against MII cycles of non-limiting embodiments relating to process 300 shown in FIG. 3. As shown in FIG. 5A, plot 500a may include TOD samples 502 (e.g., sampled at a given cycle of MII 112, as described herein) and actual TOD 504 (e.g., of data leaving PHY 114, as described herein).

In some non-limiting embodiments, the measurement of the slope $\overline{BT}$ (e.g., slop of the line associated with actual TOD 504) may be based on maintaining an estimate of the actual time per cycle of MII 112 as seen at the output port, as described herein. For the purpose of illustration, TOD samples 502 may be clustered around actual TOD 504. The line associated with actual TOD 504 may represent the true relationship between MII cycles and TOD. In some non-limiting embodiments, TOD samples 502 may not lie directly on the line associated with actual TOD 504 due to the latency uncertainty in PHY 114 (e.g., PCS 116, PMA 118, PMD 120, and/or the like). In some non-limiting embodiments, when calculating the estimated TOD for a given timestamp, TOD samples 502 at the MII may be taken into account, as described herein. Additionally or alternatively, by filtering (e.g., averaging and/or the like) enough TOD samples 502 together, an accurate slope of actual TOD 504 may be determined, as described herein, e.g., since the bit rate at the output may be relatively constant (e.g., between consecutive cycles of the MII) and/or the MII clock rate may be relatively constant. In some non-limiting embodiments, this filtering (e.g., averaging and/or the like) may also allow for Ethernet network devices 102 to automatically compensate for unpredicted differences in the clocks.

As shown in FIG. 5B, plot 500b may include TOD samples 502, actual TOD 504, internal TOD estimates 506, currently estimated slopes 508, sums 510 of the previously estimated TOD and the previously estimated slope, and previously estimated slopes 512. For the purpose of illustration, currently estimated slope 508 may be inaccurate (e.g., too low, too high, and/or the like) initially, although internal TOD estimate 506 may be accurate initially. Over time, the values of internal TOD estimates 506 and currently estimated slopes 508 may converge to accurately estimate actual TOD 504 (e.g., with respect to the data items output at the measurement point). In some non-limiting embodiments, there may be ripple around actual TOD 504, but, with a properly designed filter, this ripple can be made relatively small (e.g., arbitrarily small, selectably small, predictably small, and/or the like).

Figure 6:
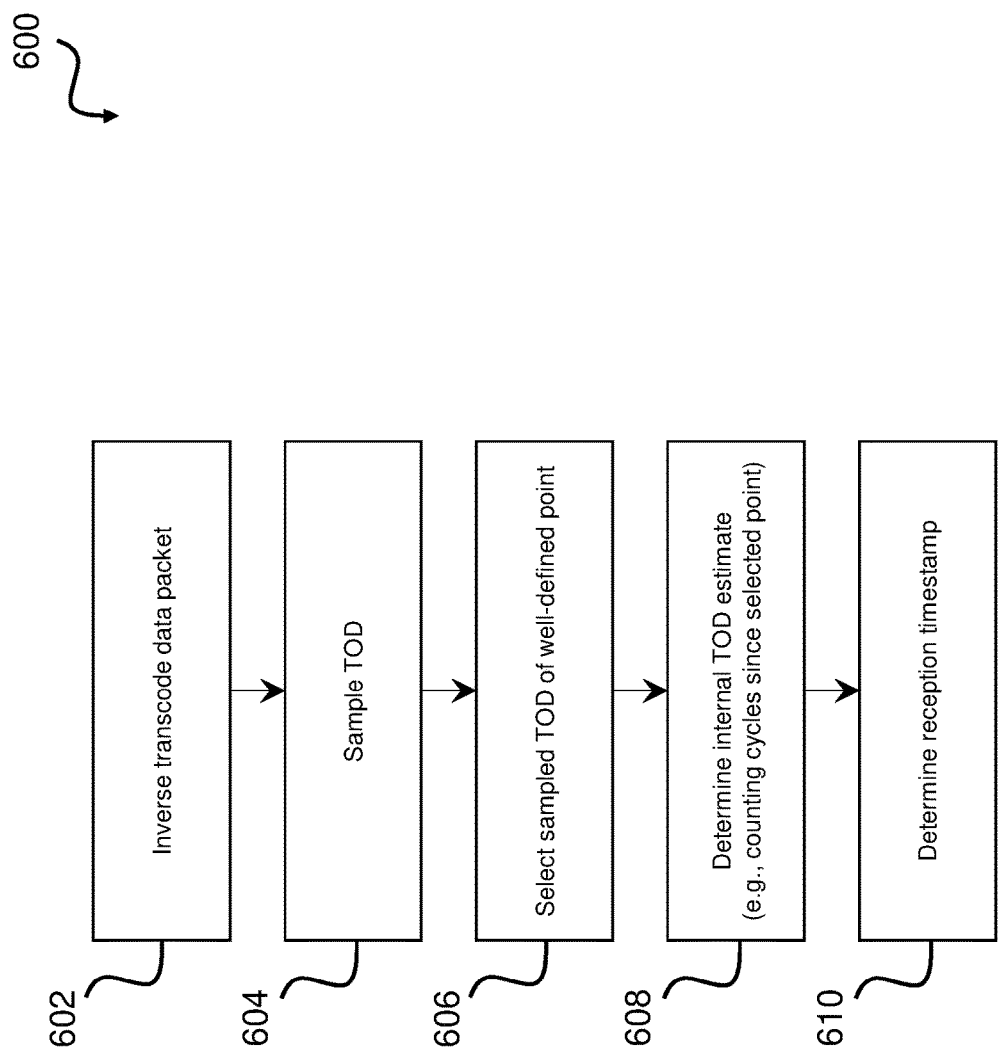
FIG. 6 is a flowchart of a non-limiting embodiment of a process for producing accurate timestamps for received data packets, according to the principles of the presently disclosed subject matter.

Referring now to FIG. 6, FIG. 6 is a flowchart of a non-limiting embodiment of a process 600 for producing accurate timestamps for receive data packets. In some non-limiting embodiments, one or more of the steps of process 600 may be performed (e.g., completely, partially, and/or the like) by MII 112 (e.g., timestamping circuitry thereof). In some non-limiting embodiments, one or more of the steps of process 600 may be performed (e.g., completely, partially, and/or the like) by another system, another device, another group of systems, or another group of devices, separate from or including MII 112, such as MAC block 108, PHY 114, PCS 116, PMA 118, PMD 120, and/or MDI 122. In some non-limiting embodiments, timestamping circuitry may be implemented (e.g., completely, partially, and/or the like) by MII 112 and/or MAC block 108.

As shown in FIG. 6, at step 602, process 600 may include inverse transcoding a data item (e.g., data packet), which may include a transmission timestamp. For example, PHY 114 may inverse transcode a data item (e.g., data packet) received from transmission medium 124.

As shown in FIG. 6, at step 604, process 600 may include sampling a TOD signal. For example, timestamping circuitry (e.g., of MII 112, MAC block 108, and/or the like) and/or PHY 114 may sample a TOD signal to provide a sampled TOD. In some non-limiting embodiments, the timestamping circuitry and/or PHY 114 may sample the TOD input signal (e.g., from MAC block 108, host layer(s) 106, and/or the like) to provide the sampled TOD. Additionally or alternatively, the timestamping circuitry and/or PHY 114 may sample an estimated TOD signal (e.g., with discontinuities removed) to provide the sampled TOD, as described herein.

In some non-limiting embodiments, the timestamping circuitry and/or PHY 114 (e.g., PCS 116 thereof) may periodically sample the TOD signal based on data items arriving at the input to PHY 114. Additionally or alternatively, the timestamping circuitry and/or PHY 114 (e.g., PCS 116 thereof) may sample the TOD signal based on a well-defined point in the input data stream (e.g., input data items) arriving at the input to PHY 114. For example, the start of an alignment marker may be such a well-defined point.

As shown in FIG. 6, at step 606, process 600 may include selecting a TOD sample of a well-defined point. For example, the timestamping circuitry and/or PHY 114 (e.g., PCS 116 thereof) may select a TOD sample of a well-defined point in the input data stream (e.g., input data items).

In some non-limiting embodiments, the input data stream (e.g., input data items) may include at least one alignment marker. Additionally or alternatively, the timestamping circuitry and/or PHY 114 (e.g., PCS 116 thereof) may select a TOD sample associated with the start of the alignment marker (e.g., of the latest virtual lane).

As shown in FIG. 6, at step 608, process 600 may include determining an internal TOD estimate. For example, the timestamping circuitry may determine the internal TOD estimate based on the selected TOD sample.

In some non-limiting embodiments, the timestamping circuitry may count the data items (e.g., bits and/or the like) between a previously known time point and the desired timestamp point. For example, the timestamping circuitry may count the data items (e.g., bits and/or the like) between the selected TOD sample and the desired timestamp point.

In some non-limiting embodiments, the timestamping circuitry may estimate the relationship (e.g., slope) between data items (e.g., bits and/or the like) and TOD, as described herein. For example, timestamping circuitry may determine the currently estimated slope of the TOD signal with respect to data items (e.g., bits) and/or with respect to cycles of MII 112, as described herein.

In some non-limiting embodiments, the timestamping circuitry may determine an internal TOD estimate based on the selected TOD sample, the count of data items (e.g., bits and/or the like) between the selected TOD sample and the desired timestamp point, and the currently estimated slope of the TOD signal (e.g., with respect to data items), as described herein. For example, the timestamping circuitry may multiply the count of data items (e.g., bits) with the currently estimated slope of the TOD signal to produce a product, and the product may be added to the selected TOD sample to produce the internal TOD estimate.

As shown in FIG. 6, at step 610, process 600 may include determining a reception timestamp. For example, the timestamping circuitry may determine a reception timestamp for a data item (e.g., a data packet, a bit thereof, and/or the like) based on the internal TOD estimate.

In some non-limiting embodiments, the reception timestamp may include (e.g., be equal to and/or the like) the internal TOD estimate.

In some non-limiting embodiments, the reception timestamp may be based on the internal TOD estimate and at least one of adding a predetermined time offset, replacing a discontinuous time sample, any combination thereof, and/or the like, as described herein.

Figure 7A:
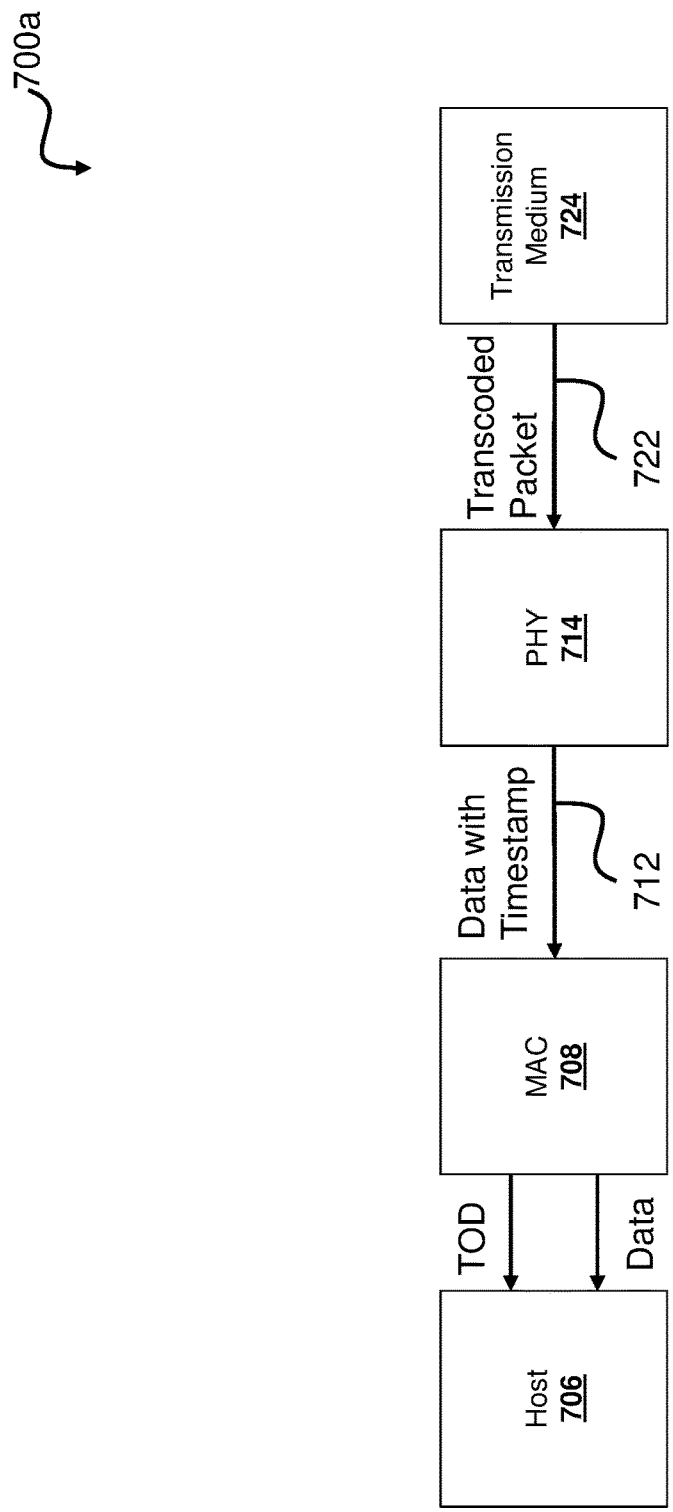
FIGS. 7A and 7B are diagrams of non-limiting embodiments of implementations of non-limiting embodiments of the process shown in FIG. 6, according to the principles of the presently disclosed subject matter.

Referring now to FIG. 7A, FIG. 7A is a diagram of an exemplary implementation 700*a* of a non-limiting embodiment relating to process 600 shown in FIG. 6. As shown in FIG. 7A, implementation 700*a* may include host layer(s) 706, MAC block 708, MII 712, PHY 714, MDI 722, and/or transmission medium 724. In some non-limiting embodiments, host layer(s) 706 may be the same as or similar to host layer(s) 106. In some non-limiting embodiments, MAC block 708 may be the same as or similar to MAC block 108. In some non-limiting embodiments, MII 712 may be the same as or similar to MII 112. In some non-limiting embodiments, PHY 714 may be the same as or similar to PHY 114. In some non-limiting embodiments, MDI 722 may be the same as or similar to MDI 122. In some non-limiting embodiments, transmission medium 724 may be the same as or similar to transmission medium 124. In some non-limiting embodiments or aspects, timestamping circuitry may include and/or be included in (e.g., be a part of, be implemented by, and/or the like) MAC block 708, MII 712, any combination thereof, and/or the like.

In some non-limiting embodiments, PHY 714 may receive a transcoded data packet from transmission medium 724 via MDI 722, as described herein. Additionally or alternatively, PHY 714 may inverse transcode the transcoded data packet to produce a data packet.

In some non-limiting embodiments, the timestamping circuitry and/or PHY 714 may sample a TOD signal based on data items arriving at the input to PHY 714, as described herein. Additionally or alternatively, the timestamping circuitry and/or PHY 714 may select a TOD sample of a well-defined point in the input data stream (e.g. input data packets), such as a start of an alignment marker, as described herein.

In some non-limiting embodiments, the timestamping circuitry may determine the internal TOD estimate based on the selected TOD sample, as described herein. For example, the timestamping circuitry may determine the internal TOD estimate based on the selected TOD sample, the count of data items (e.g., bits and/or the like) between the selected TOD sample and the desired timestamp point, and the currently estimated slope of the TOD signal (e.g., with respect to data items), as described herein.

In some non-limiting embodiments, the timestamping circuitry may determine a reception timestamp for a data item (e.g., a data packet, a bit thereof, and/or the like) based on the internal TOD estimate, as described herein.

In some non-limiting embodiments, the timestamping circuitry and/or MII 712 may communicate the data items with the reception timestamp to MAC block 708, as described herein. Additionally or alternatively, MAC block 708 may communicate the data items and the reception timestamp (or a TOD value based on the reception timestamp) to host layer(s) 706, as described herein.

Figure 7B:
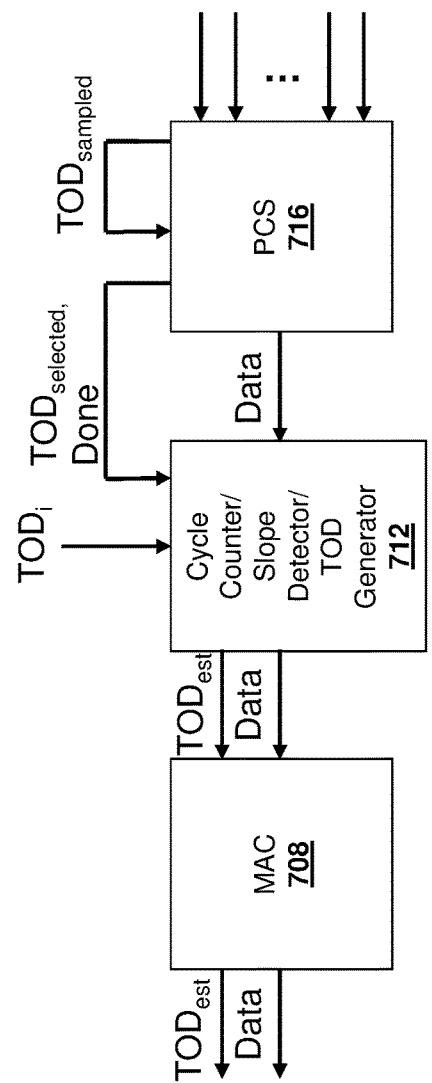

Referring now to FIG. 7B, FIG. 7B is a diagram of an exemplary implementation 700b of a non-limiting embodiment relating to process 600 shown in FIG. 6. As shown in FIG. 7B, implementation 700b may include MAC block 708, cycle counter/slope detector/TOD generator 712, and/or PCS 716. In some non-limiting embodiments, MAC block 708 may be the same as or similar to MAC block 108. In some non-limiting embodiments, cycle counter/slope detector/TOD generator 712 may be the same as or similar to MII 112 and/or the timestamping circuitry, as described herein. In some non-limiting embodiments, PCS 716 may be the same as or similar to PCS 116.

In some non-limiting embodiments, PCS 716 may receive at least one transcoded data item (e.g., a transcoded data packet, bits thereof, and/or the like), as described herein. Additionally or alternatively, PCS 716 may inverse transcode the transcoded data item(s) to produce data item(s).

In some non-limiting embodiments, PCS 716 may sample a TOD signal based on data items arriving at PCS 716 to produce at least one TOD sample ($TOD_{sampled}$), as described herein. Additionally or alternatively, PCS 716 may select one of the TOD sample(s) associated with a well-defined point in the input data stream (e.g. input data packets), such as a start of an alignment marker, to produce a selected TOD sample ($TOD_{selected}$), as described herein. In some non-limiting embodiments, PCS 716 may communicate the selected TOD sample ($TOD_{selected}$) to cycle counter/slope detector/TOD generator 712. Additionally or alternatively, PCS 716 may communicate at least one side-channel signal (e.g., "Done") to cycle counter/slope detector/TOD generator 712. For example, the one side-channel signal (e.g., "Done") may indicate that PCS 716 has selected the selected TOD sample ($TOD_{selected}$). Additionally or alternatively, PCS 716 may communicate the data items (e.g., data packet, bits thereof, and/or the like) to cycle counter/slope detector/TOD generator 712.

In some non-limiting embodiments, cycle counter/slope detector/TOD generator 712 may determine an internal TOD estimate ($TOD_{est}$) based on the selected TOD sample ($TOD_{selected}$), as described herein. For example, cycle counter/slope detector/TOD generator 712 may determine the internal TOD estimate ($TOD_{est}$) based on the selected TOD sample ($TOD_{selected}$), the count of data items (e.g., bits and/or the like) between the selected TOD sample ($TOD_{selected}$) and the desired timestamp point, and the currently estimated slope of the TOD signal (e.g., with respect to data items), as described herein.

In some non-limiting embodiments, cycle counter/slope detector/TOD generator 712 may determine a reception timestamp for a data item (e.g., a data packet, a bit thereof, and/or the like) based on the internal TOD estimate ($TOD_{est}$), as described herein. For example, the reception timestamp may include (e.g., be equal to and/or the like) the internal TOD estimate ($TOD_{est}$), as described herein.

In some non-limiting embodiments, cycle counter/slope detector/TOD generator 712 may communicate the reception timestamp and the data items to MAC block 708, as described herein.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method, comprising:
sampling, with at least one processor, a time of day (TOD) signal based on a trigger to provide a sampled TOD, wherein the sampled TOD comprises a first time value of a clock at a first time interval, and wherein sampling the TOD signal comprises:
removing a discontinuous time sample from a TOD input signal based on a threshold amount of time to provide an estimated TOD signal;
sampling the estimated TOD signal to provide the sampled TOD;
retrieving, with at least one processor, a previous TOD estimate, wherein the previous TOD estimate comprises a second time value of the clock at a second time interval that is prior to the first time interval;
determining, with at least one processor, an internal TOD estimate based on the sampled TOD and the previous TOD estimate;
adding, with at least one processor, the internal TOD estimate to a predetermined time offset to provide a sum; and
determining, with at least one processor, a timestamp based on the discontinuous time sample and the internal TOD estimate, wherein determining the timestamp comprises:
replacing the discontinuous time sample in the sum to provide the timestamp.

2. The method of claim 1, wherein removing the discontinuous time sample comprises:
comparing a current time sample from the TOD signal to a previous time sample from the TOD signal;
determining a difference between the current time sample and the previous time sample;
determining whether the difference between the current time sample and the previous time sample satisfies the threshold amount of time;
storing at least one of the current time sample or the difference as the discontinuous time sample; and
adding the previous time sample to an expected difference to provide the sampled TOD.

3. The method of claim 1, further comprising:
transcoding, with at least one processor, the timestamp into a data packet prior to transmitting the data packet via an output port.

4. The method of claim 1, wherein the sampled TOD comprising a current TOD estimate, and wherein determining the internal TOD estimate comprises:
subtracting the previous TOD estimate from the current TOD estimate to provide a TOD error signal estimate;

multiplying the TOD error signal estimate with a weight factor to provide a result;
determining a currently estimated slope of the TOD signal based on a previously estimated slope of the TOD signal and the result; and
adding the currently estimated slope of the TOD signal to the previous TOD estimate to provide the internal TOD estimate.

5. The method of claim 4, wherein the currently estimated slope of the TOD signal comprises a currently estimated value of a slope of the TOD signal with respect to cycles of a media independent interface (MII).

6. The method of claim 4, wherein determining the currently estimated slope of the TOD signal comprises adding the previously estimated slope of the TOD signal to the result to provide the currently estimated slope of the TOD signal.

7. The method of claim 4, further comprising multiplying the previously estimated slope of the TOD signal with a second weight factor to provide a second result,
wherein determining the currently estimated slope of the TOD signal comprises:
adding the second result to the result to provide the currently estimated slope of the TOD signal, wherein the weight factor comprises a first number less than one and greater than zero, the second weight factor comprises a difference between one and the weight factor, and wherein the second weight factor is greater than the weight factor.

8. A system, comprising:
at least one processor programmed or configured to:
sample a time of day (TOD) signal based on a trigger to provide a sampled TOD, wherein the sampled TOD comprises a first time value of a clock at a first time interval, and wherein, when sampling the TOD signal, the at least one processor is programmed or configured to:
remove a discontinuous time sample from a TOD input signal based on a threshold amount of time to provide an estimated TOD signal;
sample the estimated TOD signal to provide the sampled TOD;
retrieve a previous TOD estimate, wherein the previous TOD estimate comprises a second time value of the clock at a second time interval that is prior to the first time interval;
determine an internal TOD estimate based on the sampled TOD and the previous TOD estimate;
add the internal TOD estimate to a predetermined time offset to provide a sum; and
determine a timestamp based on the discontinuous time sample and the internal TOD estimate, wherein, when determining the timestamp, the at least one processor is programmed or configured to:
replace the discontinuous time sample in the sum to provide the timestamp.

9. The system of claim 8, wherein, when removing the discontinuous time sample, the at least one processor is programmed or configured to:
compare a current time sample from the TOD signal to a previous time sample from the TOD signal;
determine a difference between the current time sample and the previous time sample;
determine whether the difference between the current time sample and the previous time sample satisfies the threshold amount of time;
store at least one of the current time sample or the difference as the discontinuous time sample; and
add the previous time sample to an expected difference to provide the sampled TOD.

10. The system of claim 8, wherein the at least one processor is further programmed or configured to:
transcode the timestamp into a data packet prior to transmitting the data packet via an output port.

11. The system of claim 8, wherein the sampled TOD comprises a current TOD estimate, and wherein, when determining the internal TOD estimate, the at least one processor is programmed or configured to:
subtract the previous TOD estimate from the current TOD estimate to provide a TOD error signal estimate;
multiply the TOD error signal estimate with a weight factor to provide a result;
determine a currently estimated slope of the TOD signal based on a previously estimated slope of the TOD signal and the result; and
add the currently estimated slope of the TOD signal to the previous TOD estimate to provide the internal TOD estimate.

12. The system of claim 11, wherein the currently estimated slope of the TOD signal comprises a currently estimated value of a slope of the TOD signal with respect to cycles of a media independent interface (MII).

13. The system of claim 11, wherein, when determining the currently estimated slope of the TOD signal, the at least one processor is programmed or configured to:
add the previously estimated slope of the TOD signal to the result to provide the currently estimated slope of the TOD signal.

14. The system of claim 11, wherein the at least one processor is further programmed or configured to:
multiply the previously estimated slope of the TOD signal with a second weight factor to provide a second result; and
wherein when determining the currently estimated slope of the TOD signal, the at least one processor is programmed or configured to:
add the second result to the result to provide the currently estimated slope of the TOD signal,
wherein the weight factor comprises a first number less than one and greater than zero, the second weight factor comprises a difference between one and the weight factor, and the second weight factor is greater than the weight factor.

15. A computer program product, the computer program product comprising at least one non-transitory computer-readable medium including one or more instructions that, when executed by at least one processor, cause the at least one processor to:
sample a time of day (TOD) signal based on a trigger to provide a sampled TOD, wherein the sampled TOD comprises a first time value of a clock at a first time interval, and wherein the one or more instructions that cause the at least one processor to sample the TOD signal, cause the at least one processor to:
remove a discontinuous time sample from a TOD input signal based on a threshold amount of time to provide an estimated TOD signal;
sample the estimated TOD signal to provide the sampled TOD;
retrieve a previous TOD estimate, wherein the previous TOD estimate comprises a second time value of the clock at a second time interval that is prior to the first time interval;

determine an internal TOD estimate based on the sampled TOD and the previous TOD estimate;
add the internal TOD estimate to a predetermined time offset to provide a sum; and
determine a timestamp based on the discontinuous time sample and the internal TOD estimate, wherein the one or more instructions that cause the at least one processor to determine the timestamp, cause the at least one processor to:
replace the discontinuous time sample in the sum to provide the timestamp.

16. The computer program product of claim 15, wherein the one or more instructions that cause the at least one processor to remove the discontinuous time sample, cause the at least one processor to:
compare a current time sample from the TOD signal to a previous time sample from the TOD signal;
determine a difference between the current time sample and the previous time sample;
determine whether the difference between the current time sample and the previous time sample satisfies the threshold amount of time;
store at least one of the current time sample or the difference as the discontinuous time sample; and
add the previous time sample to an expected difference to provide the sampled TOD.

17. The computer program product of claim 15, wherein the one or more instructions further cause the at least one processor to:
transcode the timestamp into a data packet prior to transmitting the data packet via an output port.

18. The computer program product of claim 15, wherein the sampled TOD comprises a current TOD estimate, and wherein the one or more instructions that cause the at least one processor to determine the internal TOD estimate, cause the at least one processor to:
subtract the previous TOD estimate from the current TOD estimate to provide a TOD error signal estimate;
multiply the TOD error signal estimate with a weight factor to provide a result;
determine a currently estimated slope of the TOD signal based on a previously estimated slope of the TOD signal and the result; and
add the currently estimated slope of the TOD signal to the previous TOD estimate to provide the internal TOD estimate.

19. The computer program product of claim 18, wherein the currently estimated slope of the TOD signal comprises a currently estimated value of a slope of the TOD signal with respect to cycles of a media independent interface (MII).

20. The computer program product of claim 18, wherein the one or more instructions further cause the at least one processor to:
multiply the previously estimated slope of the TOD signal with a second weight factor to provide a second result; and
wherein the one or more instructions that cause the at least one processor to determine the currently estimated slope of the TOD signal, cause the at least one processor to:
add the second result to the result to provide the currently estimated slope of the TOD signal,
wherein the weight factor comprises a first number less than one and greater than zero, the second weight factor comprises a difference between one and the weight factor, and the second weight factor is greater than the weight factor.

* * * * *